United States Patent
Nagamitsu et al.

(10) Patent No.: US 7,454,390 B2
(45) Date of Patent: Nov. 18, 2008

(54) INGREDIENT COOKING-OPERATION RECOGNITION SYSTEM AND COMPUTER-READABLE RECORDING MEDIUM WHICH IS RECORDED WITH INGREDIENT COOKING-OPERATION RECOGNITION PROGRAM

(75) Inventors: Sachio Nagamitsu, Kyoto (JP); Michihiko Minoh, Kyoto (JP); Yoko Yamakata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 308 days.

(21) Appl. No.: 10/573,387

(22) PCT Filed: Mar. 17, 2005

(86) PCT No.: PCT/JP2005/004828

§ 371 (c)(1),
(2), (4) Date: Mar. 24, 2006

(87) PCT Pub. No.: WO2005/088542

PCT Pub. Date: Sep. 22, 2005

(65) Prior Publication Data

US 2007/0114224 A1 May 24, 2007

(30) Foreign Application Priority Data

Mar. 17, 2004 (JP) ............................. 2004-076472

(51) Int. Cl.
G06N 5/00 (2006.01)
(52) U.S. Cl. ..................... 706/45; 706/50; 426/665; 426/388

(58) Field of Classification Search ............. 706/45–48, 706/50–52, 31, 61; 426/65, 388, 390, 417, 426/420, 443, 496, 523; 99/324, 334, 341
See application file for complete search history.

(56) References Cited

U.S. PATENT DOCUMENTS 5,278,921 A 1/1994 Nakamura et al.

(Continued)

FOREIGN PATENT DOCUMENTS

JP 4-346333 12/1992

(Continued)

OTHER PUBLICATIONS

Reiko Hamada, Ichiro Ide, Shuichi Sakai "Associating Cooking Video with Related Textbook", Nov. 2000 Multimedia '00: Proceedings of the 2000 ACM workshops on Multimedia, pp. 237-241.*

(Continued)

*Primary Examiner*—David R Vincent
*Assistant Examiner*—Omar F Fernandez Rivas
(74) *Attorney, Agent, or Firm*—Wenderoth, Lind & Ponack, L.L.P.

(57) ABSTRACT

An ingredient cooking-operation recognition system is provided which is capable of precisely specifying an ingredient that is cooked by a person and a cooking operation for the ingredient, and accurately estimating a cooking recipe for a dish that is prepared by the person. The system includes a sensing section which has an optical camera, a thermal camera, and a microphone that acquires an environment sound. Moreover, the system includes a feature-quantity template creation section which creates a feature-quantity template and a recognition processing section. The recognizing processing section calculates, on the basis of observation data acquired by the sensing section, an observation certainty factor and a cooking operation, creates a cooking flow based on the observation certainty factors, calculates a relevance factor of this cooking flow and recognizes the ingredient, the cooking operation and a cooking recipe.

8 Claims, 21 Drawing Sheets

U.S. PATENT DOCUMENTS

| | | | | |
|---|---|---|---|---|
| 5,832,446 | A * | 11/1998 | Neuhaus | 705/1 |
| 6,583,723 | B2 | 6/2003 | Watanabe et al. | |
| 2002/0171674 | A1* | 11/2002 | Paris | 345/700 |
| 2004/0099144 | A1* | 5/2004 | Kudo et al. | 99/325 |

FOREIGN PATENT DOCUMENTS

| | | |
|---|---|---|
| JP | 2000-293685 | 10/2000 |
| JP | 2002-251234 | 9/2002 |
| JP | 2003-6642 | 1/2003 |
| JP | 2003-281297 | 10/2003 |

OTHER PUBLICATIONS

Reiko Hamada, Ichiro Ide, Shuichi Sakai, Hidehiko Tanaka "Structural Analysis of Cooking Preparation Steps in Japanese" Nov. 2000 IRAL '00: Proceedings of the fifth international workshop on on Information retrieval with Asian languages, pp. 157-164.*

Reiko Hamada, Ichiro Ide, Shuichi Sakai, Hidehiko Tanaka "Associating Video with Relating Document" Oct. 1999 Multimedia '99: Proceedings of the seventh ACM international conference on Multimedia (Part 2), pp. 17-20.*

Miura et al. "Associating Semantically Structured Cooking Videos with their Preparation Steps" System and Computers in Japan, 2005, pp. 51-62.*

Tee et al. "A Visual Recipe book for Persons with Language Impairments" CHI 2005, Apr. 2-7, 2005, pp. 501-510.*

Toshimasa Iijima et al., "The Method to Detect One's Action by Analysis of Sequential View Images in Everyday Life", The Institute of Electronics, Information and Communication Engineers Gijutsu Kenkyu Hokoku, MVE2001-18 to 42 Multimedia, Kaso Kankyo Kiso, vol. 101, No. 204, Shadan Hojin Denshi Joho Tsushin Gakkai, Jul. 11, 2001, pp. 83-90.

Reiko Hamada et al., "Kyoyo Bangumi no Text Kyozai ni okeru Tejun no Kozoka", Information Processing Society of Japan Dai 59 Kai (Heisei 11 Nen Koki) Zenkoku Taikai Koen Ronbunshu (2) Jinko Chino to Ninchi Kagaku, Shadan Hojin Joho Shori Gakkai, Sep. 28, 1999, pp. 2-353 to 2-354.

Reiko Hamada et al., "Ryori Gazo ni okeru Gazo Ninshiki Shuho no Kento", Information Processing Society of Japan Dai 61 Kai (Heisei 12 Nen Koki) Zenkoku Taikai Koen Ronbunshu (2) Jinko Chino to Ninchi Kagaku, Shadan Hojin Joho Shori Gakkai, Oct. 3, 2000, pp. 2-191 to 2-192.

Yasutaka Suba et al., "Ryori Eizo no Ken'inzuke no tameno Onkyo Kaiseki Shuho no Kento", Information Processing Society of Japan Dai 64 Kai (Heisei 14 Nen) zenkoku Taikai Koen Ronbunshu (2) Jinko Chino to Ninchi Kagaku, Shadan Hojin Joho Shori Gakkai, Mar. 12, 2002, pp. 2-17 to 2-18.

"The Detection of an Object in a Dish Image Based on a Constraint from Text Information (No. 2C1-02, Jun. 2003)", from the papers in the 17th Annual Conference of the Japanese Society for Artificial Intelligence.

Kuo-Chung Tai, "The Tree-to-Tree Correction Problem", Journal of the Association for Computing Machinery, vol. 26. No. 3, Jul. 1979. pp. 422-433.

* cited by examiner

FIG. 3A

INGREDIENT TABLE

| INGREDIENT NAME | COLOR (INCLUDING INSIDE INFORMATION) | SHAPE | SIZE | ..... |
|---|---|---|---|---|
| APPLE | OUT;RED(△),[IN;WHITE] | CIRCLE(△) | 5cm × 5cm × 5cm(△) | |
| TOMATO | OUT;RED(×),[IN;RED] | CIRCLE(△) | 5cm × 5cm × 5cm(△) | |
| DAIKON RADISH | OUT;WHITE(×),[IN;WHITE] | ELLIPSE(○) | 5cm × 5cm × 35cm(△) | |
| ... | | | | |

COOKED-FOOD TABLE

| COOKING OPERATION | CHANGE IN SHAPE | COLOR | ..... |
|---|---|---|---|
| FINE CUTTING | LARGE→SMALL,FEW→MANY(◎) | OUT→IN(◎) | |
| ROUND SLICING | →FLAT SURFACE(○) | OUT→OUT+IN(○) | |
| QUARTER CUTTING | 1/4 SPHERE(△) | OUT→OUT+IN(○) | |
| CUTTING (JULIENNE CUTTING) | →THIN STRIP(◎) | OUT→IN(○) | |
| PEELING | LITTLE CHANGE(×) | OUT→IN(◎) | |
| BROILING | SLIGHT CHANGE(○) | BROWNED(◎) | |
| BRAISING | HARD TO RECOGNIZE(×) | LARGE CHANGE(○) | |

COOKING-OPERATION TABLE

| COOKING OPERATION | SOUND | HAND MOTION | ..... |
|---|---|---|---|
| FINE CUTTING | CONTINUOUS SOUND/HARD TO TELL FROM JULIENNE CUTTING(○) | QUICK(◎) | |
| ROUND SLICING | CUTTING SOUND(△) | POSSIBLE MISJUDGMENT(△) | |
| QUARTER CUTTING | CUTTING SOUND(△) | POSSIBLE MISJUDGMENT(△) | |
| CUTTING (JULIENNE CUTTING) | CONTINUOUS SOUND/HARD TO TELL FROM FINE CUTTING(○) | QUICK(◎) | |
| PEELING | LOW SOUND(×) | HARD TO JUDGE(×) | |
| BROILING | POSSIBLE MISJUDGMENT(△) | UNABLE TO JUDGE(×) | |
| BRAISING | POSSIBLE JUDGMENT DELAY(×) | UNABLE TO JUDGE(×) | |

◎ ; WEIGHTING VALUE=0.8~1.0(0.90)
○ ; WEIGHTING VALUE=0.5~0.8(0.65)
△ ; WEIGHTING VALUE=0.2~0.5(0.35)
× ; WEIGHTING VALUE=0.2~0.0(0.10)

FIG. 4

FEATURE-QUANTITY TEMPLATE

| INGREDIENT NAME | FINE CUTTING | ROUND SLICING | QUARTER CUTTING | JULIENNE CUTTING | PEELING | BROILING | BRAISING |
|---|---|---|---|---|---|---|---|
| APPLE | ×INAPPLICABLE[NO MENU] | ○→RED+RED+WHITE,A FEW→MANY | ○→RED→RED+WHITE[HARD TO JUDGE SHAPE] | ×INAPPLICABLE[NO MENU] | ◎RED→WHITE | ◎BROWNED | ×INAPPLICABLE |
| TOMATO | △→SMALL[SHAPE IS LOST, UNABLE TO JUDGE COLOR] | ○→FLAT[HARD TO JUDGE COLOR] | ○→1/4SPHERE[HARD TO JUDGE COLOR] | ×INAPPLICABLE | △[HARD TO JUDGE] | △[HARD TO JUDGE] | ×[SHAPE IS LOST] |
| DAIKON RADISH | ○→FREQUENTLY[UNABLE TO JUDGE COLOR] | ○→FLAT[HARD TO JUDGE COLOR] | ○→1/4SPHERE[HARD TO JUDGE COLOR] | ◎→THIN STRIP[HARD TO JUDGE COLOR] | △[HARD TO JUDGE] | ○BROWNED | △COLORED |
| ... | | | | | | | |
| ... | | | | | | | |

BY-RECIPE FEATURE-QUANTITY TEMPLATE

BAKED APPLE AND TOMATO

| INGREDIENT NAME | CUTTING | PEELING |
|---|---|---|
| APPLE | ×[NO MENTION IN RECIPE] | ×[NO MENTION IN RECIPE] |
| TOMATO | ◎(FINE CUTTING)→SMALL[NO PEELING/BAKING] | ×[NO MENTION IN RECIPE] |
| DAIKON RADISH | ×[NO MENTION IN RECIPE] | ×[NO MENTION IN RECIPE] |
| ... | | |

T5

| BROILING | BRAISING |
|---|---|
| ◎BROWNED[NO CUTTING] | ×[NO MENTION IN RECIPE] |
| ×[NO MENTION IN RECIPE] | ×[NO MENTION IN RECIPE] |
| ×[NO MENTION IN RECIPE] | ×[NO MENTION IN RECIPE] |

FIG. 5B

BY-RECIPE FEATURE-QUANTITY TEMPLATE

SALAD AND DAIKON RADISH SIMMERED IN BROTH

| INGREDIENT NAME | CUTTING | PEELING | BROILING | BRAISING |
|---|---|---|---|---|
| APPLE | ○(QUARTER CUTTING)RED→RED+WHITE[HARD TO JUDGE SHAPE] | ◎RED→WHITE | ×[NO MENTION IN RECIPE] | ×[NO MENTION IN RECIPE] |
| TOMATO | ○(ROUND CUTTING)→FLAT[HARD TO JUDGE COLOR] | △[COLORED] | ×[NO MENTION IN RECIPE] | ×[NO MENTION IN RECIPE] |
| DAIKON RADISH | ◎(JULIENNE CUTTING)→THIN STRIP[HARD TO JUDGE COLOR] | △[COLORED] | ○BROWNED | ×[NO MENTION IN RECIPE] |
| ... | | | | |

T6

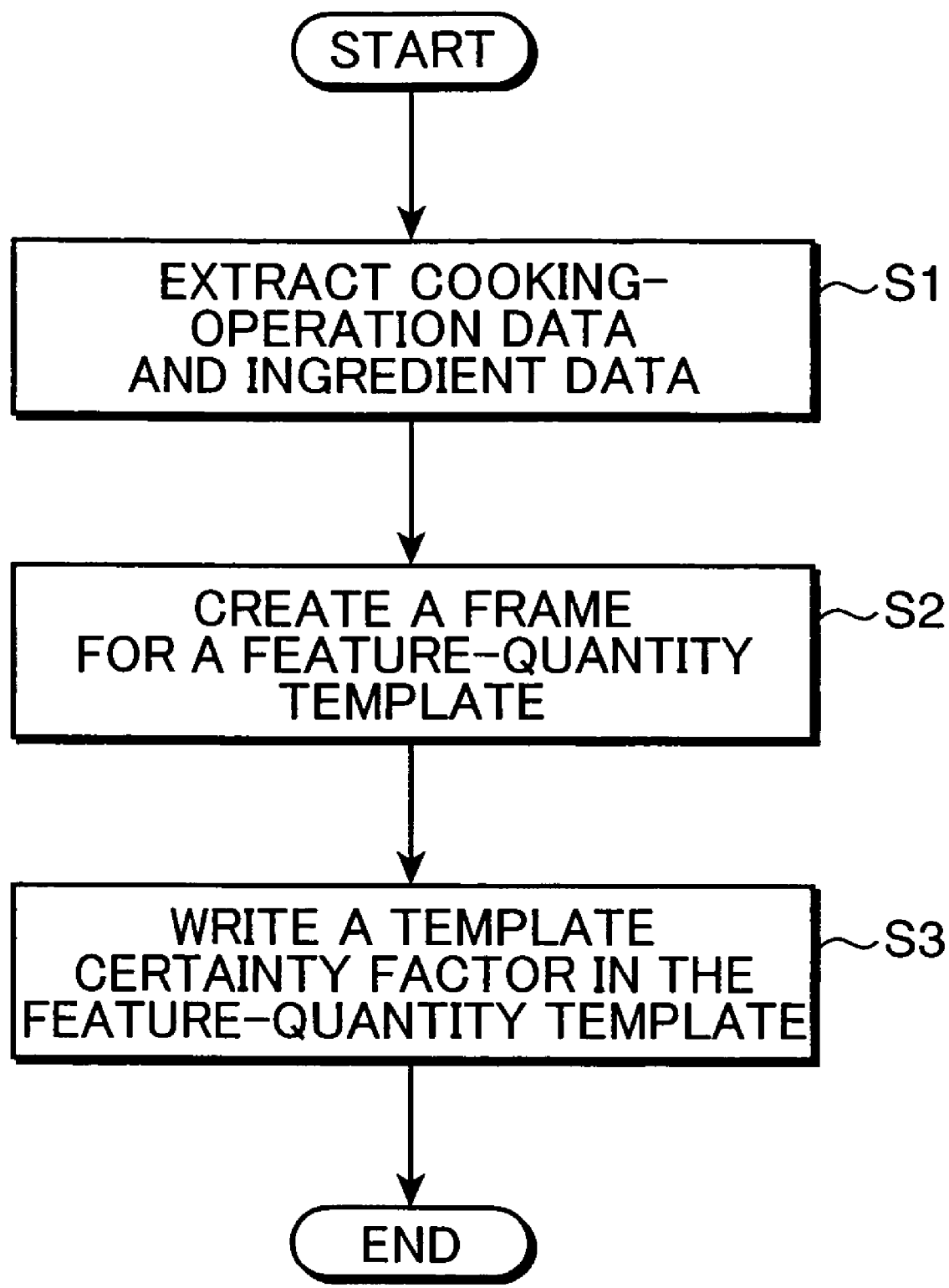

FIG. 7A

INGREDIENT TABLE

| INGREDIENT NAME | COLOR (INCLUDING INSIDE INFORMATION) | SHAPE | SIZE |
|---|---|---|---|
| APPLE | OUT;RED(△),[IN;WHITE] | CIRCLE(△) | 5cm × 5cm × 5cm(△) |
| TOMATO | OUT;RED(×),[IN;RED] | CIRCLE(△) | 5cm × 5cm × 5cm(△) |
| DAIKON RADISH | OUT;WHITE(×),[IN;WHITE] | ELLIPSE(○) | 5cm × 5cm × 35cm(△) |
| ... | | | |

COOKED-FOOD TABLE

| COOKING OPERATION | CHANGE IN SHAPE | SIZE |
|---|---|---|
| FINE CUTTING | LARGE→SMALL,A FEW→MANY(◎) | OUT→IN(◎) |
| ROUND SLICING | →FLAT SURFACE(○) | OUT→OUT+IN(○) |
| QUARTER CUTTING | 1/4 SPHERE(△) | OUT→OUT+IN(○) |
| CUTTING (JULIENNE CUTTING) | →THIN STRIP(◎) | OUT→IN(○) |
| PEELING | LITTLE CHANGE(×) | OUT→IN(◎) |
| BROILING | SLIGHT CHANGE(○) | BROWNED(◎) |
| BRAISING | HARD TO RECOGNIZE(×) | LARGE CHANGE(○) |
| ... | | |

FIG. 7B

COOKING-OPERATION TABLE

| COOKING OPERATION | SOUND | HAND MOTION | ..... |
|---|---|---|---|
| FINE CUTTING | CONTINUOUS SOUND/HARD TO TELL FROM JULIENNE CUTTING(○) | QUICK(○) | |
| ROUND SLICING | CUTTING SOUND(△) | POSSIBLE MISJUDGMENT(△) | ← R3 |
| QUARTER CUTTING | CUTTING SOUND(△) | POSSIBLE MISJUDGMENT(△) | |
| CUTTING (JULIENNE CUTTING) | CONTINUOUS SOUND/HARD TO TELL FROM FINE CUTTING(○) | QUICK(○) | |
| PEELING | LOW SOUND(×) | HARD TO JUDGE(×) | |
| BROILING | POSSIBLE MISJUDGMENT(△) | UNABLE TO JUDGE(×) | |
| BRAISING | POSSIBLE JUDGMENT DELAY(×) | UNABLE TO JUDGE(×) | ← T3 |

FIG. 7C

F1 — FEATURE-QUANTITY TEMPLATE

| INGREDIENT NAME | FINE CUTTING | ROUND SLICING |
|---|---|---|
| APPLE | ×INAPPLICABLE[NO MENU] | ◎RED→RED+WHITE,A FEW→MANY |
| TOMATO | △→SMALL[SHAPE IS LOST, UNABLE TO JUDGE COLOR] | ○→FLAT[HARD TO JUDGE COLOR] |
| DAIKON RADISH | ○→FREQUENTLY[UNABLE TO JUDGE COLOR] | ○→FLAT[HARD TO JUDGE COLOR] |
| ... | | |

| JULIENNE CUTTING | QUARTER CUTTING |
|---|---|
| ×INAPPLICABLE[NO MENU] | ○RED→RED+WHITE[HARD TO JUDGE SHAPE] |
| ×INAPPLICABLE[NO MENU] | ○→1/4SPHERE[HARD TO JUDGE COLOR] |
| ◎→THIN STRIP[HARD TO JUDGE COLOR] | ○→1/4SPHERE[HARD TO JUDGE COLOR] |

T4

| PEELING | BROILING | BRAISING |
|---|---|---|
| ◎RED→WHITE | ◎BROWNED | ×INAPPLICABLE |
| △[HARD TO JUDGE] | △[HARD TO JUDGE] | ×[SHAPE IS LOST] |
| △[HARD TO JUDGE] | ○BROWNED | △COLORED |

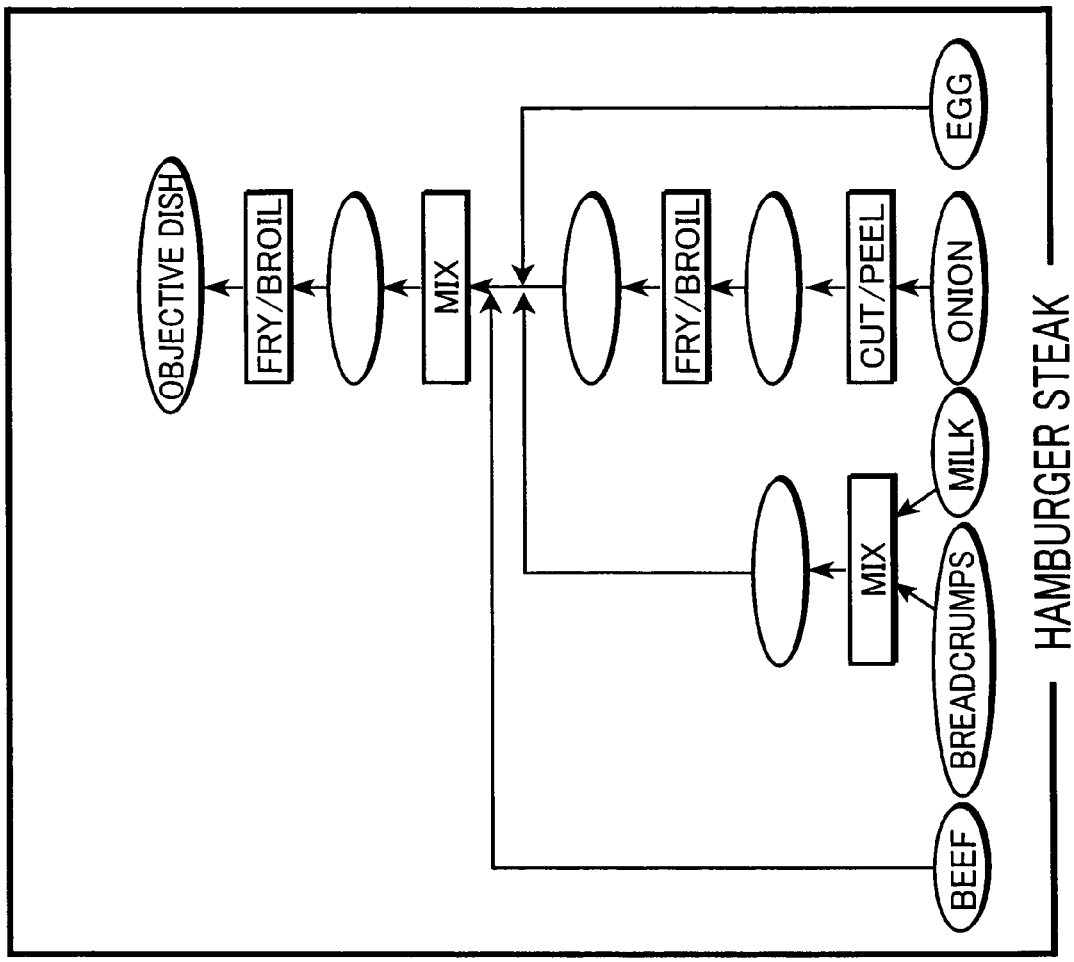
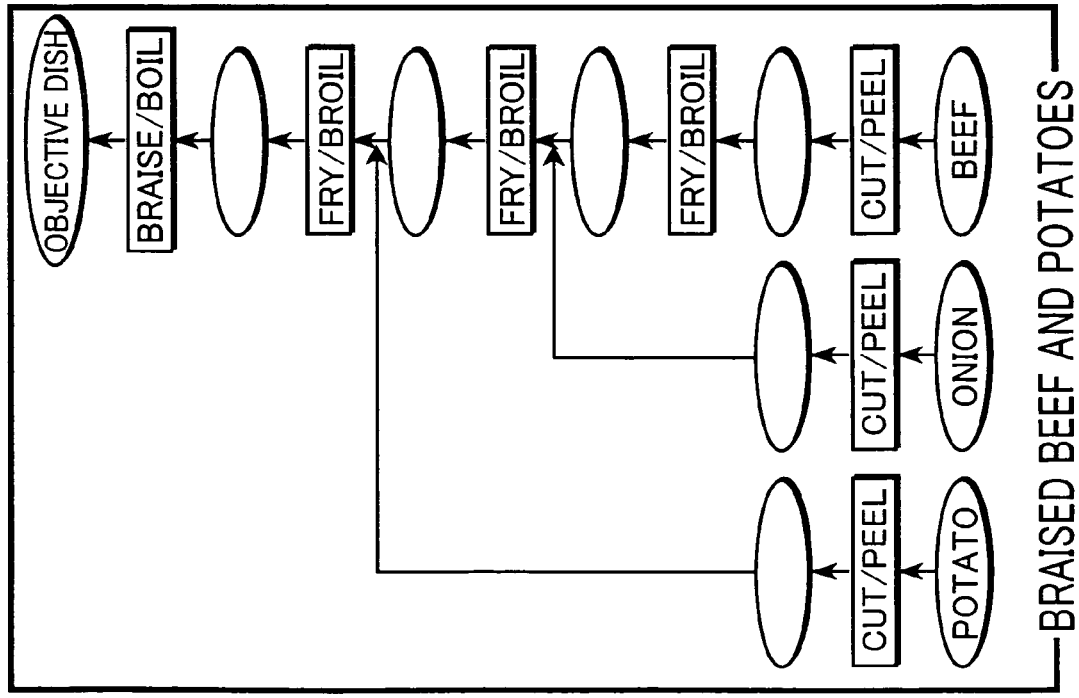

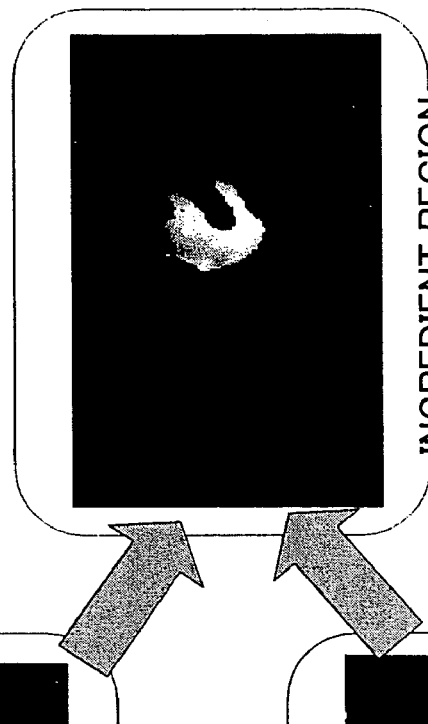
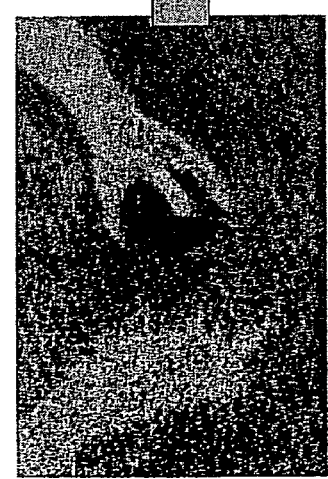
FIG.14A ORIGINAL IMAGE → OPTICAL CAMERA → FIG.14B BACKGROUND DIFFERENCE
FIG.14C ORIGINAL IMAGE → THERMAL CAMERA → FIG.14D BACKGROUND DIFFERENCE
FIG.14E INGREDIENT REGION

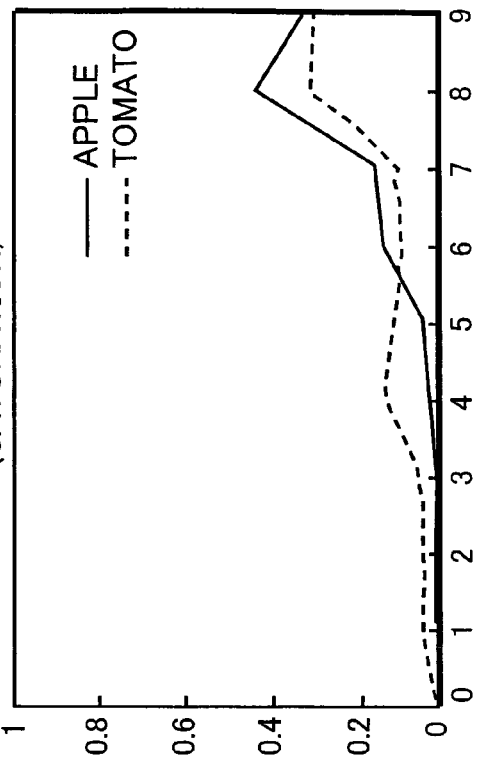
FIG. 17A  BEFORE COOKING OPERATION (HUE)
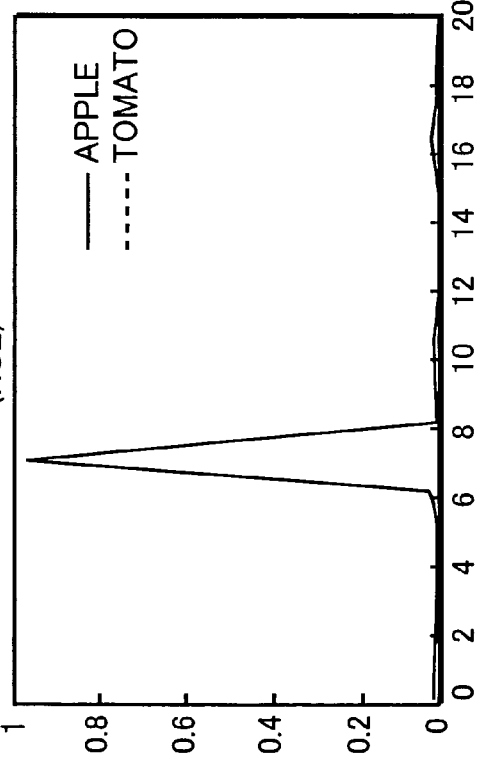
FIG. 17B  AFTER COOKING OPERATION (SATURATION)
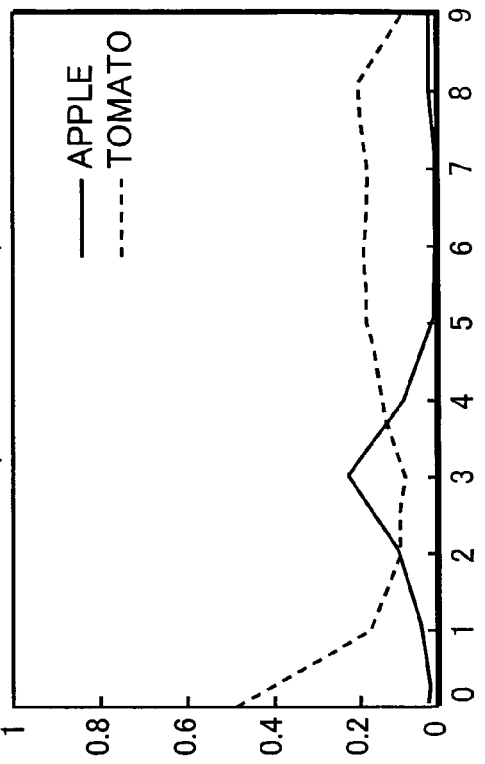
FIG. 17C  BEFORE COOKING OPERATION (HUE)
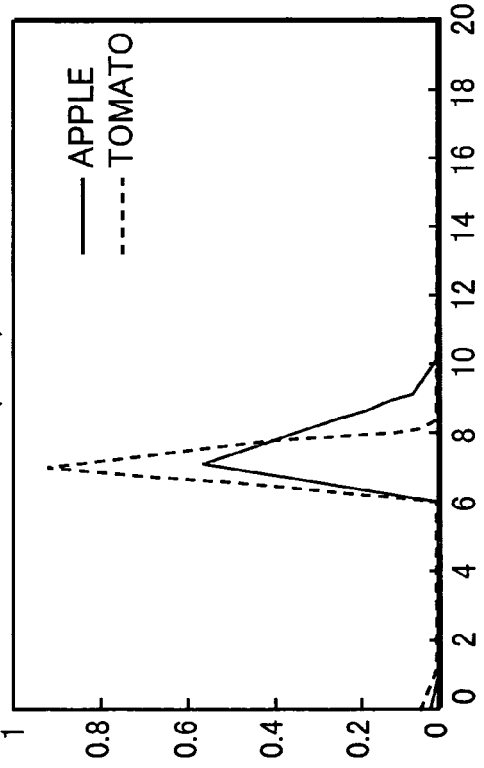
FIG. 17D  AFTER COOKING OPERATION (SATURATION)

INGREDIENT COOKING-OPERATION RECOGNITION SYSTEM AND COMPUTER-READABLE RECORDING MEDIUM WHICH IS RECORDED WITH INGREDIENT COOKING-OPERATION RECOGNITION PROGRAM

BACKGROUND OF THE INVENTION

The present invention relates to an art of recognizing an ingredient and a cooking operation for the ingredient, using observation data.

Non-patent Document 1: "The detection of an object in a dish image based on a constraint from text information (no. 2C1-02, June, 2003)", from the papers in the 17th Annual Conference of the Japanese Society for Artificial Intelligence.

Non-patent Document 1 discloses a technique of: storing, based on an image which is obtained from an optical camera, the feature quantity of an ingredient as a knowledge template; calculating a certainty factor which indicates the certainty of the ingredient in the image, using this knowledge template; and recognizing the ingredient and a cooking operation which is included in the image.

SUMMARY OF THE INVENTION

However, the art described in Non-patent Document 1 has a disadvantage in that a great certainty factor is unable to be obtained, so that an ingredient and a cooking operation cannot be precisely recognized.

It is an object of the present invention to provide an ingredient cooking-operation recognition system and an ingredient cooking-operation recognition program which are capable of precisely recognizing an ingredient that is cooked by a person and a cooking operation for the ingredient.

The ingredient cooking-operation recognition system according to the present invention, characterized by including: a sensing means for acquiring observation data which includes at least either of an image around the hands of a person who performs a cooking operation and an environment sound that is produced by the cooking operation; a feature-quantity template in which various cooking operations that are predetermined for various ingredients are stored in a table form, together with a template certainty factor that is a certainty factor which is predetermined for each cooking operation of the ingredients; a cooking-flow creating means for, based on the observation data which is acquired by the sensing means, calculating an observation certainty factor which indicates the certainty factor of at least either of an ingredient that is cooked by the person and the cooking operation of the ingredient, and based on this observation certainty factor, creating a cooking flow for a dish which is prepared by the person; a primary certainty-factor calculating means for, based on the template certainty factor and the observation certainty factor, calculating a primary certainty factor which is a certainty factor for each of objects that make up the cooking flow which is created by the cooking-flow creating means; and a cooking-operation recognizing means for calculating a final certainty factor based on the primary certainty factor which is calculated by the primary certainty-factor calculating means, updating the feature-quantity template by considering this final certainty factor as a new template certainty factor, and based on this feature-quantity template, recognizing the ingredient and the cooking operation that correspond to the observation data which is acquired by the sensing means.

According to this configuration, based on an image around the hands of a person who performs a cooking operation and an environment sound which is produced by the cooking operation which is acquired by the sensing means, an observation certainty factor is calculated of an ingredient which is cooked by the person and the cooking operation of this ingredient. Then, a cooking flow is created based on this observation certainty factor. Next, based on the template certainty factor and the observation certainty factor, a primary certainty factor is calculated for each of the objects that make up the cooking flow. Then, a final certainty factor is calculated based on these relevance factor and primary certainty factor. Thereby, the ingredient of an image which is acquired by the sensing means and its cooking operation are recognized.

In short, a cooking operation and an ingredient are recognized based on the feature-quantity template in which the template certainty factor is stored. This makes it possible to precisely estimate an ingredient and a cooking operation.

BRIEF DESCRIPTION OF THE DRAWINGS

FIGS. 3A to 3D are each a table, showing a data structure of an ingredient table.

FIG. 4 is a table, showing a data structure of a feature-quantity template.

FIGS. 5A and 5B are tables showing data structures of a by-recipe feature-quantity template for a cooking recipe for baked apple and tomato, and a by-recipe feature-quantity template for a cooking recipe for salad and daikon radish simmered in broth.

FIG. 6 is a flow chart, showing a creation processing of the feature-quantity template.

FIGS. 7A, 7B and 7C are tables showing a transition in the creation processing of the feature-quantity template.

FIG. 9A is a diagram, showing a cooking flow of braised beef and potatoes which is stored in a cooking-flow database.

FIG. 9B is a diagram, showing a cooking flow of hamburger steak which is stored in the cooking-flow database.

FIGS. 14A to 14E are photographs, showing that a background region is removed.

FIGS. 17A to 17D are graphical representations, showing histograms of the hue and saturation of an apple and a tomato before and after a cooking operation is executed.

FIG. 17A is a graphical representation, showing a histogram of the hue before the cooking operation is executed.

FIG. 17B is a graphical representation, showing a histogram of the saturation before the cooking operation is executed.

FIG. 17C is a graphical representation, showing a histogram of the hue after the cooking operation is executed.

FIG. 17D is a graphical representation, showing a histogram of the saturation after the cooking operation is executed.

DETAILED DESCRIPTION OF THE INVENTION

Figure 1B:
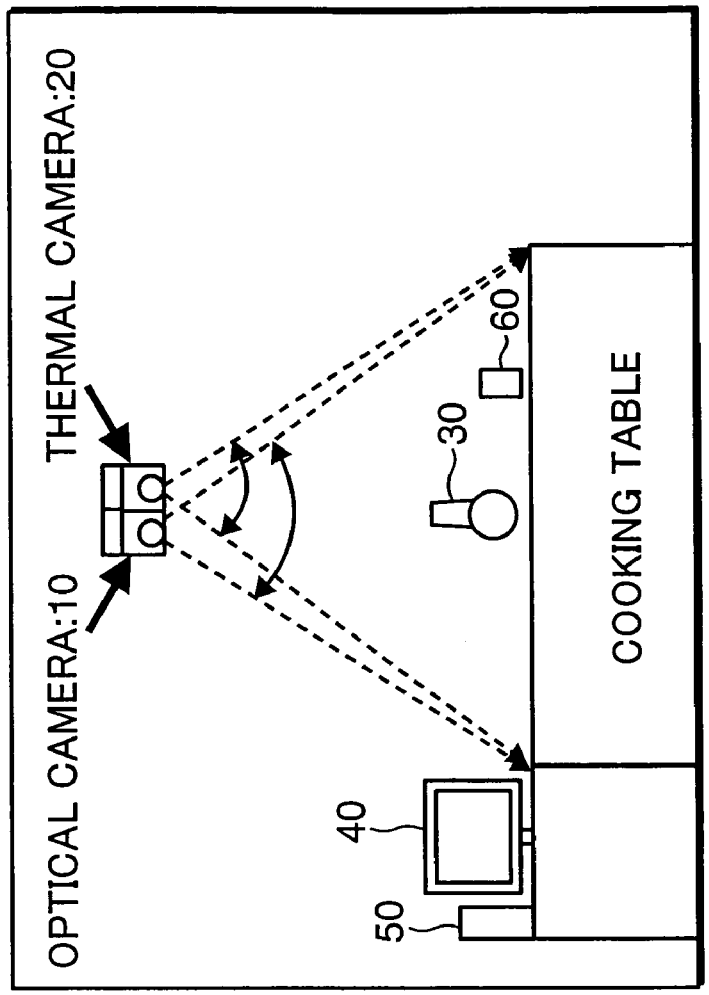
FIG. 1B is a front view of the ingredient cooking-operation recognition system, showing its entire configuration.
Figure 1A:
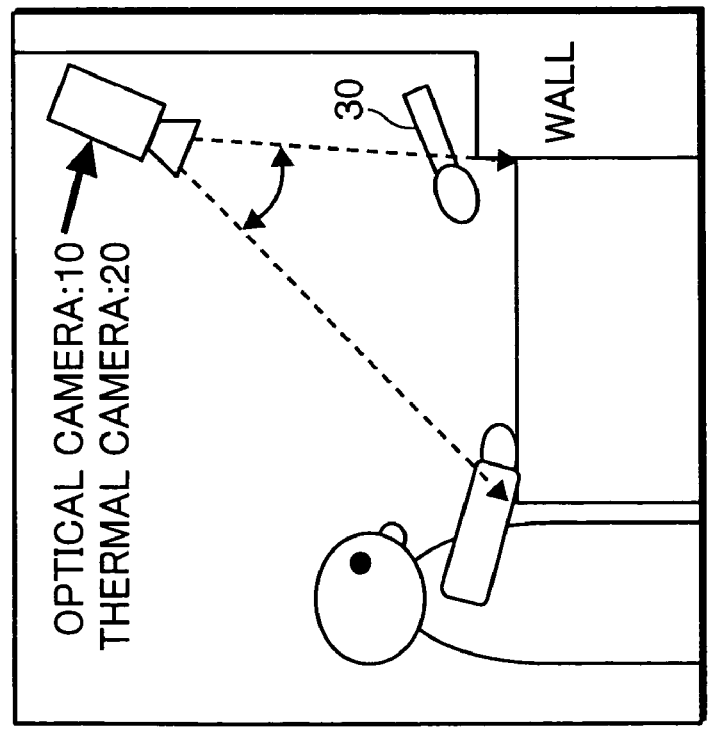
FIG. 1A is a side view of the ingredient cooking-operation recognition system according to an embodiment of the present invention, showing its entire configuration.

FIG. 1A is a side view of the ingredient cooking-operation recognition system according to an embodiment of the present invention, showing its entire configuration. FIG. 1B is a front view of the ingredient cooking-operation recognition system, showing its entire configuration. The ingredient cooking-operation recognition system shown in FIGS. 1A and 1B includes: an optical camera 10; a thermal camera 20; a microphone 30; a display unit 40; a speaker 50; an RFID tag reader 60; and a data processing unit (not shown). The optical camera 10 is formed by a publicly-known dynamic-image camera. It is placed above a cooking table so as to take a photograph around the hands of a person who performs a cooking operation on the cooking table. Thereby, it acquires an optical image which is a dynamic image.

The thermal camera 20 is attached above a cooking table, takes a photograph around the hands of a person who performs a cooking operation and acquires a thermal image which is a dynamic image.

The microphone 30 is located near the upper surface of a cooking table and acquires an environment sound that is made by cooking. The display unit 40 is formed by a liquid-crystal panel, a plasma panel, a CRT, or the like. It displays various images for giving the person guidance about cooking recipes. The speaker 50 outputs various voices for giving the person guidance on cooking recipes. The RFID tag reader 60 reads, from an RFID tag which is attached to each ingredient, ingredient data which is stored in the RFID tag. Such ingredient data includes data that represents the name of an ingredient to which an RFID tag is attached.

Figure 2:
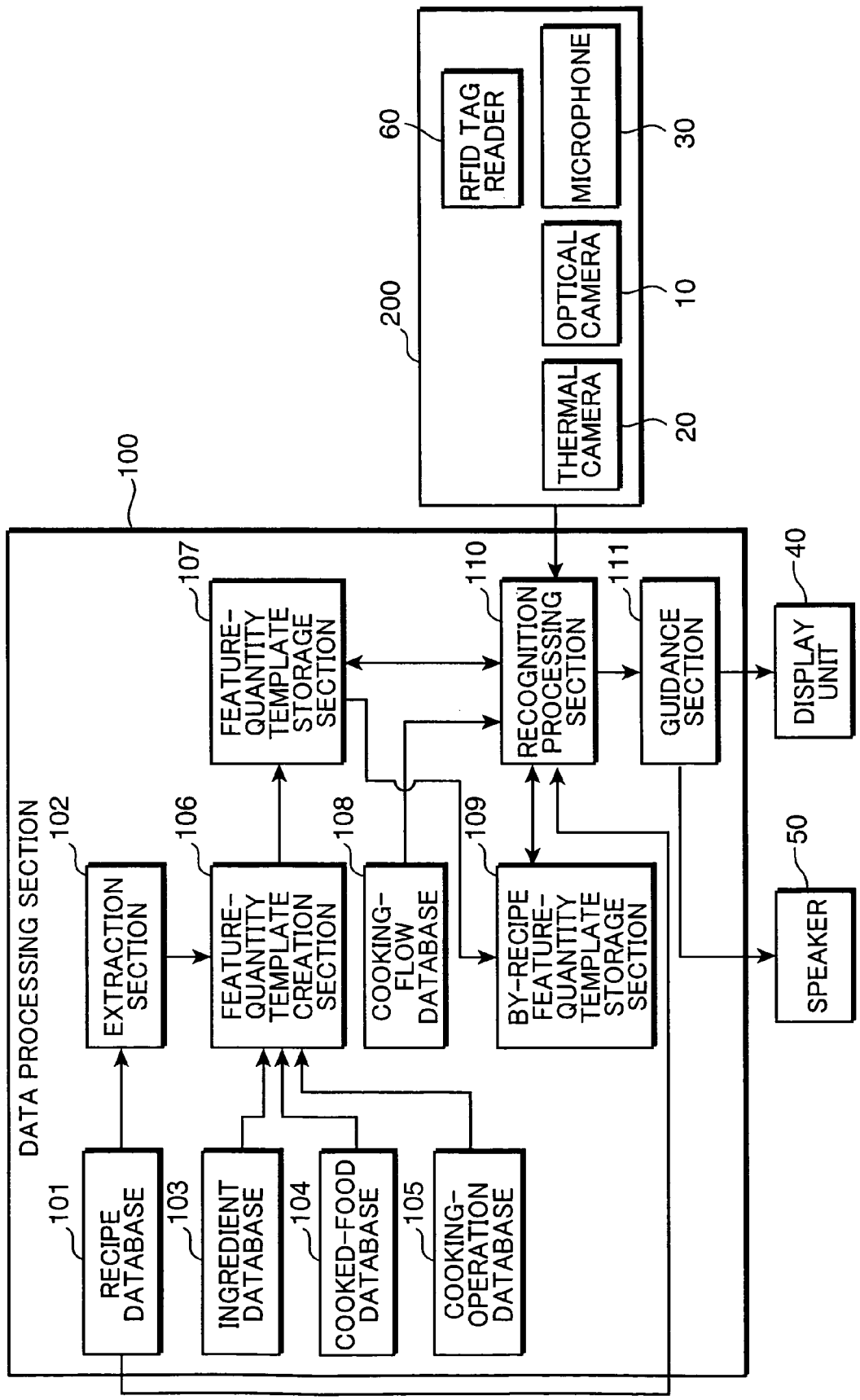
FIG. 2 is a block diagram, showing a function of the ingredient cooking-operation recognition system.

FIG. 2 is a block diagram, showing a function of this ingredient cooking-operation recognition system. This ingredient cooking-operation recognition system includes a data processing section 100 and a sensing section 200. The data processing section 100 is formed by a CPU, a ROM, a RAM, a hard disk, or the like. It has the functions of: a recipe database 101; an extraction section 102; an ingredient database 103; a cooked-food database 104; a cooking-operation database 105; a feature-quantity template creation section 106; a feature-quantity template storage section 107; a cooking-flow database 108; a by-recipe feature-quantity template storage section 109; a recognition processing section 110; and a guidance section 111.

The CPU executes an ingredient cooking-operation recognition program which is stored in the ROM, so that these functions can be realized.

In the recipe database 101, cooking-recipe data is stored which represents cooking recipes for various dishes. This cooking-recipe data is text data, and it includes: data on an ingredient which indicates the name of an ingredient that is used for each dish; and data on a cooking operation which is given to each ingredient, such as cutting, boiling, roasting, and the like.

The extraction section 102 extracts ingredients and cooking operations for those ingredients which are used in the whole cooking-recipe data that is stored in the recipe database 101.

In the ingredient database 103, an ingredient table T1 is stored as shown in FIG. 3A. In the cooked-food database 104, a cooked-food table T2 is stored as shown in FIG. 3B. In the cooking-operation database 105, a cooking-operation table T3 is stored as shown in FIG. 3C.

The ingredient table T1 shown in FIG. 3A is made up of an ingredient record which includes a field for an ingredient's name, color, shape, size, or the like. In it, there is stored the color, shape, size or the like of each ingredient. In the ingredient-name field, data is stored which expresses the name of an ingredient. Data on the color of an ingredient is stored in the color field. Herein, there is stored data on the color of the internal part of an ingredient, as well as data on the color of its external appearance. For example, if the rind of an apple is red and its interior is white, data is stored in the color field, like "Outside; red (Δ), [Inside; white]". Herein, the symbol of (Δ) stands for a template certainty factor which is a predetermined certainty factor. In terms of a tomato, its skin is red and the inside is also red. Hence, in the color field, data is stored like "Outside; red (X), [Inside; red]".

In the field of a shape, data is stored which expresses the external shape of an ingredient. Since an apple and a tomato are circular and a daikon radish is elliptic, data is stored in each shape field, like "circle" and "circle", and "ellipse".

The cooked-food table T2 shown in FIG. 3B is made up of a cooked-food record which includes a field for a cooking operation, a change in shape, color, or the like. In it, there are stored a change in the shape of an ingredient and a change in its color by each cooking operation. In the cooking-operation field, data is stored which expresses the name of a cooking operation. As the cooking operation, there is fine cutting, round slicing, quarter cutting, julienne cutting, peeling, broiling, braising, or the like. Herein, the cooking operations enumerated above are an example, and thus, another cooking operation may also be included. Besides, some of those cooking operations can also be omitted.

In the shape-change field, data is stored which expresses the shape of an ingredient that is changed by its corresponding cooking operation. For example, in the case of mincing, an ingredient changes from a large size to a small size and from one piece to many pieces. Hence, "large→small, few→many" is stored in the shape-change field of mincing. In the field of color, data is stored which stands for the color of an ingredient that changes through its corresponding cooking operation. For example, if an ingredient is minced, its internal color appears as a whole. Thus, "outside→inside" is stored in the color field of mincing. On the other hand, if an ingredient is cut into round slices, its external color and internal color both appear as the main color. Hence, "outside→outside+inside" is stored in the color field of round slicing.

The cooking-operation table T3 shown in FIG. 3C is made up of a cooking-operation record which includes a field for a cooking operation, a sound, a motion of a person's hands, or the like. In it, there are stored an environment sound, a hand motion and the like which are produced by each cooking operation. In the field of a cooking operation, data which indicates the name of a cooking operation is stored in the same way as the cooked-food table T2. In the sound field, an environment sound is stored which is made by each cooking operation.

The ingredient table T1 to the cooking-operation table T3 are created beforehand, and the template certainty factor which is stored in each field is also predetermined. Herein, such a certainty factor is a numerical value which indicates the certainty of an ingredient and a cooking operation to be estimated. Hence, the higher the certainty factor becomes, the closer the estimated ingredient and cooking operation will come to the ingredient which is really cooked by a person and its cooking operation.

In each table shown in FIGS. 3A to 3C, the template certainty factor is expressed using a mark of ⊚, ○, Δ, X. As shown in FIG. 3D: ⊚ indicates that the template certainty factor is within a value range of 0.8 to 1.0; ○ indicates that the template certainty factor is within a value range of 0.5 to 0.8; Δ indicates that the template certainty factor is within a value range of 0.2 to 0.5; X indicates that the template certainty factor is within a value range of 0.0 to 0.2.

The feature-quantity template creation section 106 shown in FIG. 2 considers, as an item of each row, an ingredient which is extracted by the extraction section 102. Then, it creates a frame for a feature-quantity template which is a table where a cooking operation is an item of each line. Besides, the feature-quantity template creation section 106 regards, as an item of each row, an ingredient which is extracted for every recipe by the extraction section 102. Then, it creates a frame for a by-recipe feature-quantity template which is a table where a cooking operation is an item of each line.

Furthermore, based on the template certainty factor which is stored in each field of the ingredient table T1, the cooked-food table T2 and the cooking-operation table T3, the feature-quantity template creation section 106 writes a template certainty factor in each field of the feature-quantity template and the by-recipe feature-quantity template. Then, it allows the feature-quantity template storage section 107 and the by-recipe feature-quantity template storage section 109 to store it.

Figure 10A:
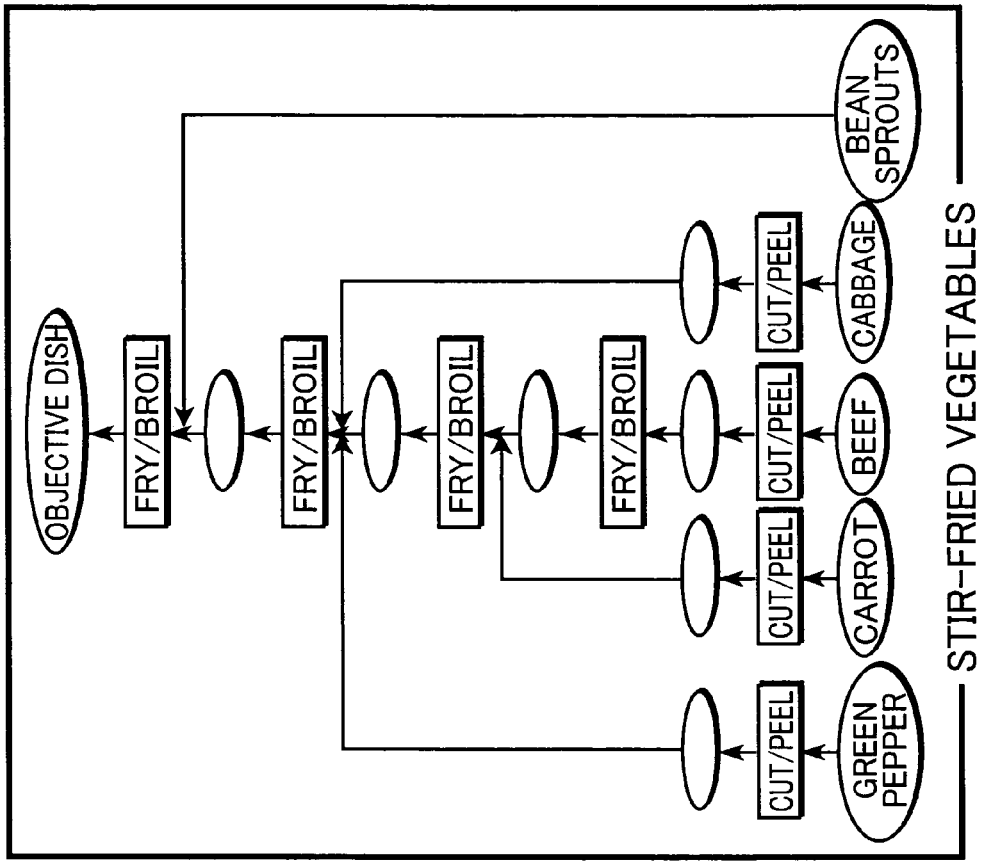
FIG. 10A is a diagram, showing a cooking flow of beef curry which is stored in the cooking-flow database.
Figure 10B:
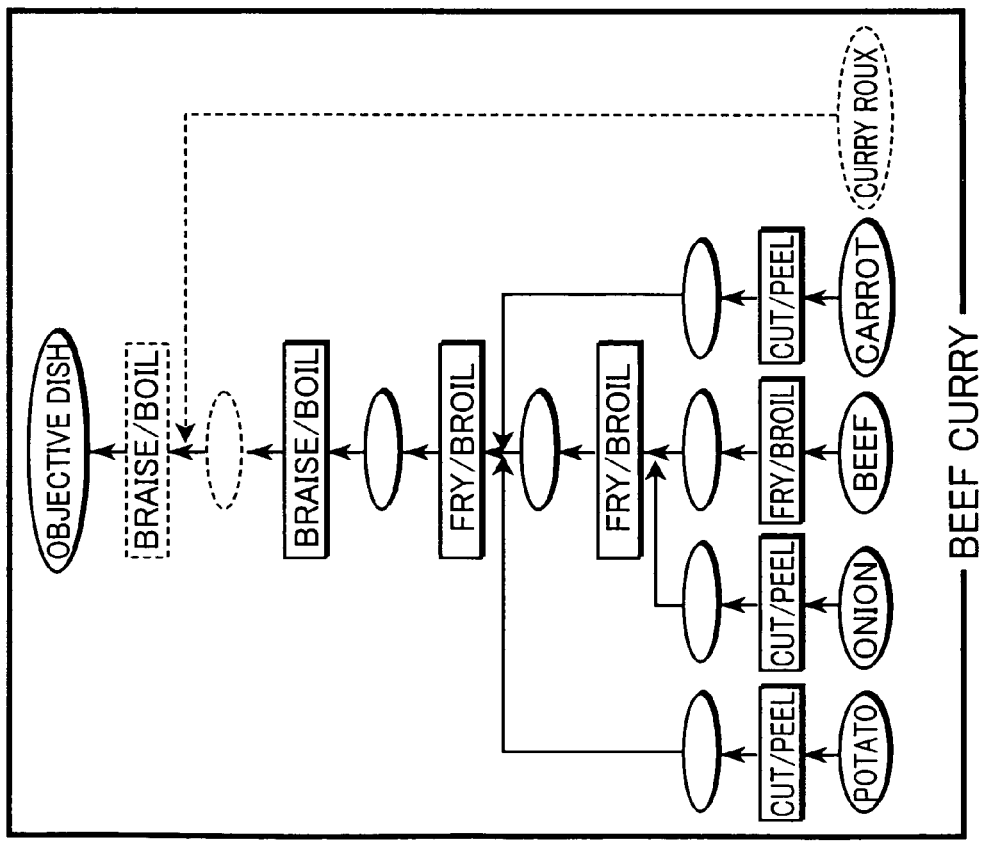
FIG. 10B is a diagram, showing a cooking flow of stir-fried vegetables which is stored in the cooking-flow database.

The feature-quantity template storage section 107 stores the feature-quantity template which is created by the feature-quantity template creation section 106. In the cooking-flow database 108, a cooking flow is stored which orderly indicates the cooking processes of cooking recipes for various dishes. FIGS. 9A and 9B and FIGS. 10A and 10B are each a diagram, showing a cooking flow which is stored in the cooking-flow database 108. FIG. 9A shows a cooking flow of braised beef and potatoes, and FIG. 9B shows a cooking flow of hamburger steak. FIG. 10A shows a cooking flow of beef curry, and FIG. 10B shows a cooking flow of stir-fried vegetables. In FIGS. 9A and 9B and FIGS. 10A and 10B, an object which is expressed by an ellipse stands for an ingredient, and an object which is expressed by a rectangle represents a cooking operation. The higher the position of an object becomes, the closer the object will get to the final process in a cooking process. Besides, an object which has no characters in its ellipse means an ingredient which has undergone the cooking operation expressed in the object at the stage right below it.

In the case of braised beef and potatoes shown in FIG. 9A, beef is subjected to the cooking operation of "cut/peel". Thereafter, it undergoes the cooking operation of "fry/broil". Then, together with onion which has been given the cooking operation of "cut/peel", it is subjected to the cooking operation of "fry/broil". Afterward, the onion and beef which have been given the cooking operation of "fry/broil" undergo the cooking operation of "fry/broil" with potato which has been given the cooking operation of "cut/peel". Thereafter, they are subjected to the cooking operation of "braise/boil". Consequently, braised beef and potatoes which is the object is completed.

The recognition processing section 110 executes a processing such as mapping, based on observation data which is outputted from the sensing section 200. Thereby, it estimates a cooking recipe for a dish which is now prepared by a person. In addition, it recognizes an ingredient which is now cooked by the person and its cooking operation. Herein, mapping is well known, and its details are disclosed in Publicly-known Document 1 (The Tree-to-Tree Correction Problem (KUO-CHUNG TAI): Journal of the Association for Computing Machinery, Vol 26. No 3, July 1979. pp 422-433).

Herein, the recognition processing section 110 corresponds to the cooking-flow creating means, the primary certainty-factor calculating means, the relevance-factor calculating means and the cooking-operation recognizing means.

The guidance section 111 outputs voice data and image data which are stored in advance for a cooking recipe that is estimated by the recognition processing section 110, from the speaker 50 and the display unit 40, respectively. Thereby, it gives the person guidance on the cooking recipe. Herein, the guidance section 111 executes guidance about a cooking process which is presently cooked by a user.

The sensing section 200 is formed by: the thermal camera 20; the optical camera 10; the microphone 30; and the RFID tag reader 60, which are shown in FIG. 1A or 1B. It outputs, to the recognition processing section 110, as observation data: a thermal image which is photographed by the thermal camera 20; an optical image which is photographed by the optical camera 10; an environment sound that is acquired by the microphone 30; and ingredient data which is read by the RFID tag reader 60.

FIG. 4 is a table, showing a data structure of a feature-quantity template T4. The feature-quantity template T4 is made up of feature-quantity records which have the fields of an ingredient name, mincing, round slicing, quarter cutting, julienne cutting, peeling, broiling and braising. In the example of FIG. 4, cooking operations which are extracted by the extraction section 102 are an ingredient name, mincing, round slicing, quarter cutting, julienne cutting, peeling, broiling and braising. Thus, their fields are created in the feature-quantity template T4. Therefore, if another cooking operation except these is extracted by the extraction section 102, the field of this cooking operation is included in the feature-quantity template T4. Herein, a phrase which is described in each field of the feature-quantity template T4 is suitably shown for suggesting which data a template certainty factor has been determined from. In practice, only a template certainty factor is stored, and data on the phrases shown in the table is not stored.

In the ingredient-name field, there is stored the name of an ingredient which is extracted by the extraction section 102. Herein, the processing of creating the feature-quantity template T4 will be described later.

FIGS. 5A and 5B are tables showing data structures of a by-recipe feature-quantity template T5 for a cooking recipe for baked apple and tomato, and a by-recipe feature-quantity template T6 for a cooking recipe for salad and daikon radish simmered in broth. The by-recipe feature-quantity template T5 includes the fields of an ingredient name, cutting, peeling, broiling and braising. The cutting, peeling, broiling and braising are cooking operations which are included in the feature-quantity template T4. They are cooking operations which are included in the cooking recipe for baked apple and tomato.

The by-recipe feature-quantity template T6 includes the fields of an ingredient name, cutting, peeling, broiling and braising. The cutting, peeling, broiling and braising are cooking operations which are included in the feature-quantity template T4. They are cooking operations for salad and daikon radish simmered in broth.

Next, a creation processing for a feature-quantity template will be described, using the flow chart shown in FIG. 6 and the transition of the tables shown in FIGS. 7A, 7B and 7C. First, in a step S1, the extraction section 102 extracts all cooking operations and all ingredients which are included in all of the cooking recipes that are stored in the recipe database 101.

In a step S2, the feature-quantity template creation section 106 creates a frame for a feature-quantity template which is a table that has, as items, the ingredients and cooking operations which have been extracted at the step S1. In the case of the feature-quantity template T4 in FIGS. 7A, 7B and 7C, mincing, round slicing, quarter cutting, julienne cutting, peeling, broiling and braising are included as the cooking-operation data in the recipe database 101. Hence, these cooking operations are items in each row. Besides, an apple, a tomato, a giant white radish and the like are included as the ingredients, an thus, these ingredient names are items in each line.

In a step S3, according to the template certainty factor which is stored in each field of the ingredient table T1, the cooked-food table T2 and the cooking-operation table T3, the feature-quantity template creation section 106 writes a template certainty factor in each field of the feature-quantity template T4.

Specifically, a template certainty factor is written in the following way. In the feature-quantity template T4 shown in FIGS. 7A, 7B and 7C, a field FI1 of the round slicing for an apple is described as an example. The ingredient name which corresponds to the field FI1 is an apple, and thus, an ingredient record R1 where an apple is stored is extracted from the ingredient table T1. In addition, the cooking operation which corresponds to the field FI1 is round slicing, and thus, a cooked-food record R2 and a cooking-operation record R3 where round slicing is stored are extracted from the cooked-food table T2 and the cooking-operation table T3, respectively.

Among the template certainty factors which are stored in the fields that make up the ingredient record R1, the greatest template certainty factor is "Δ". Besides, among the template certainty factors which are stored in the fields that make up the cooked-food record R2, the greatest template certainty factor is "◯". In addition, among the template certainty factors which are stored in the fields that make up the cooking-operation record R3, the greatest template certainty factor is "Δ". Accordingly, among the template certainty factors which are stored in the fields of the ingredient record R1, the cooked-food record R2 and the cooking-operation record R3, the greatest template certainty factor is "◯". Therefore, the template certainty factor of "◯" is written in the field FI1 of the feature-quantity template T4.

In this way, a template certainty factor is written in each field of the feature-quantity template T4, so that the feature-quantity template T4 is created. The created feature-quantity template T4 is stored in the feature-quantity template storage section 107. Herein, a by-recipe feature-quantity template is created in the same way.

Next, an operation of this ingredient cooking-operation recognition system will be described according to the flow chart shown in FIG. 8. First, in a step S11, the sensing section 200 acquires observation data and transmits it to the data processing section 100. In a step S12, the recognition processing section 110 executes a processing for determining an ingredient and a cooking operation, based on a thermal image which is photographed by the thermal camera 20, an optical image which is photographed by the optical camera 10 and an environment sound which is acquired by the microphone 30.

Thus, it determines an ingredient which is now cooked by a person and a cooking operation for this ingredient. Thereby, it calculates observation certainty factors which are a certainty factor for this ingredient and a certainty factor for this cooking operation. Herein, the processing for determining an ingredient and a cooking operation will be described in detail later, using the flow chart shown in FIG. 12.

In a step S13, using the ingredient and the cooking operation which are determined at the step S12, the recognition processing section 110 creates a cooking flow which expresses the cooking procedure in which the person has so far performed the cooking from the beginning.

Figure 11B:
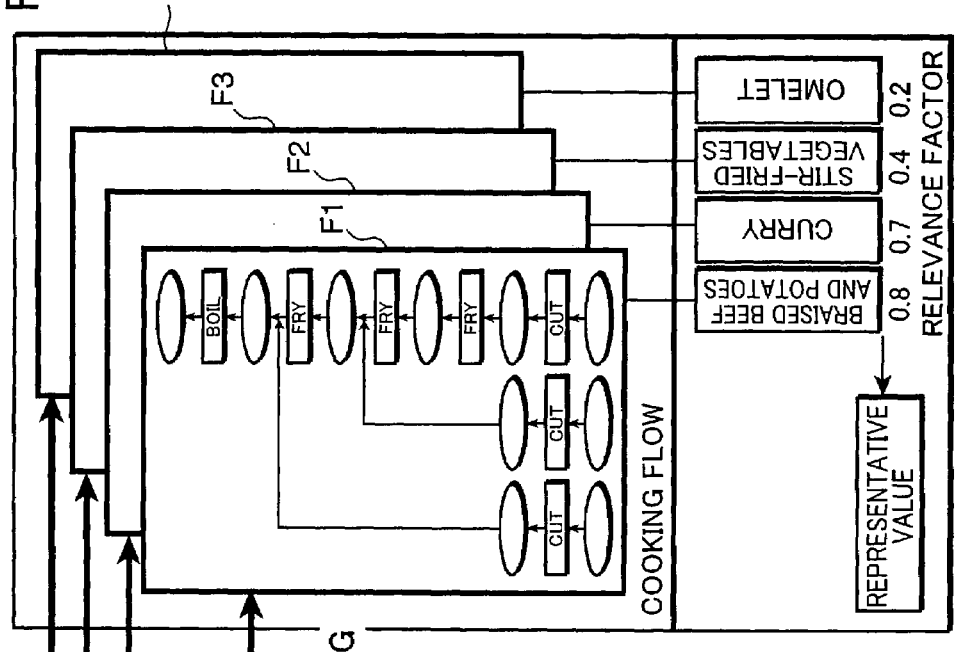
FIG. 11B is a diagram, showing mapping and cooking flows which are stored in advance in the cooking-flow database.
Figure 11A:
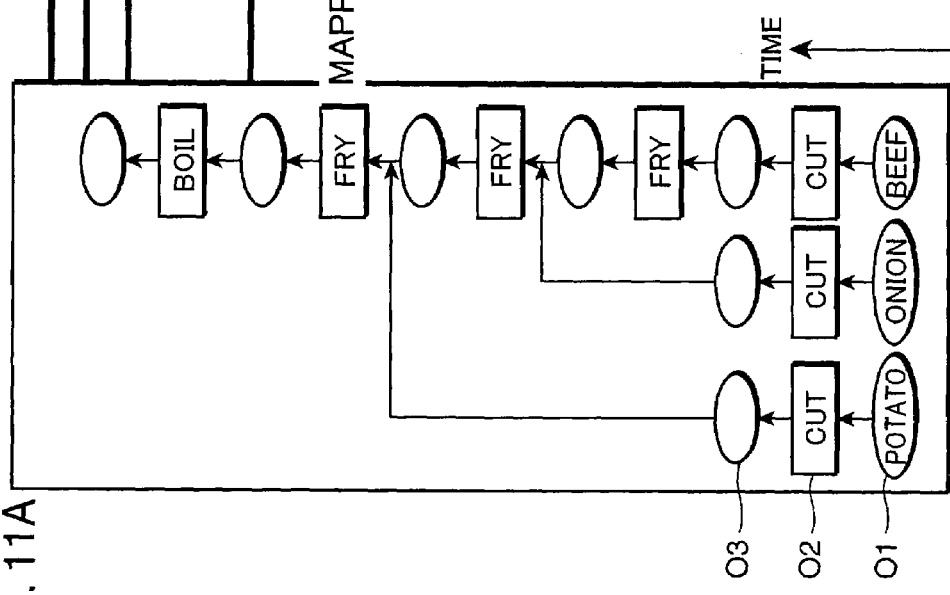
FIG. 11A is a diagram, showing mapping and a cooking flow to be created.

In this case, such a cooking flow is created as shown in FIG. 11A. In this cooking flow, it can be seen that a potato, an onion and beef are used as its ingredients. Then, on these ingredients, a cooking operation is performed, such as "cut", "fry" and "braise". Thereby, the cooking flow is created.

Figure 8:
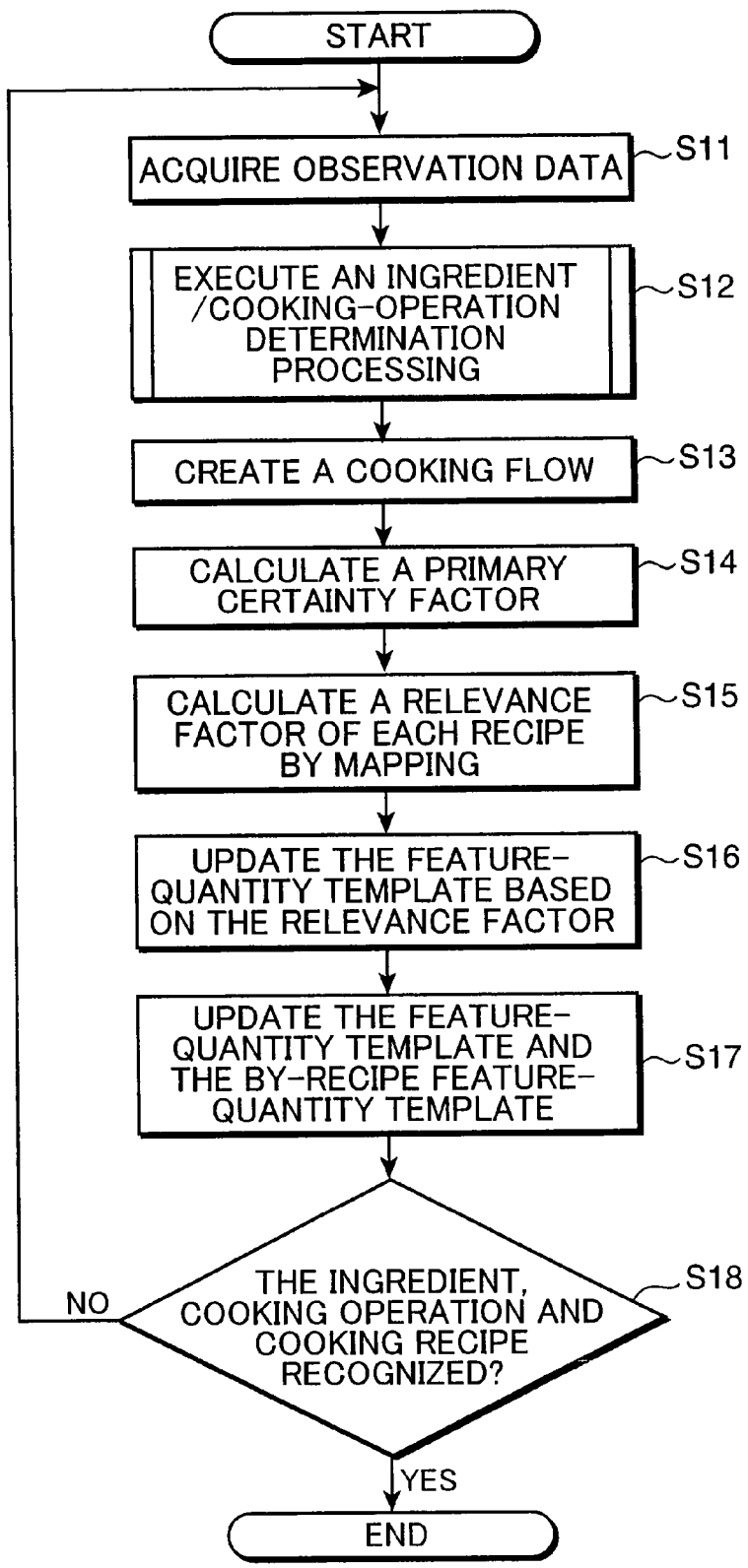
FIG. 8 is a flow chart, showing an operation of the ingredient cooking-operation recognition system.

In a step S14 shown in FIG. 8, the recognition processing section 110 multiplies the observation certainty factors of the cooking operation and the ingredient which has been obtained at step S12 and the template certainty factor which is stored in the corresponding field that is stored in the feature-quantity template T4. Thereby, it calculates a primary certainty factor (=template certainty factor X observation certainty factor) which is a certainty factor for each of the objects that make up the cooking flow.

As a concrete example, in the cooking flow shown in FIG. 11A, a calculation is made for a primary certainty factor C1 which corresponds to an object O1 and a primary certainty factor C2 which corresponds to an object O2.

Herein, for convenience, in the cooking flow shown in FIG. 11A, the object O1 is an apple, instead of a potato. In terms of the object O2, cutting is replaced by round slicing. Besides, in the feature-quantity template T4 shown in FIG. 4, the template certainty factor of round slicing for an apple is set at A1.

Then, at the step S12, let's assume that the observation certainty factor of an apple is calculated as B1 and the observation certainty factor of round slicing is calculated as B2. In that case, the primary certainty factor C1 for the object O1 is calculated by C1=B1×A1. The primary certainty factor C2 for the object O2 is calculated by C2=B2×A1.

In a step S15, the recognition processing section 110 executes mapping between the cooking flow which has been created at step S13 and each cooking flow which is stored in the cooking-flow database 108. Thus, it calculates a relevance factor that indicates which of the cooking flows stored in the cooking-flow database 108 is closest to a dish which is now prepared by a person. Herein, calculating a relevance factor by mapping is disclosed in Publicly-known Document 1 described above.

FIG. 11A is a diagram, showing mapping and a cooking flow to be created. FIG. 11B is a diagram, showing mapping and cooking flows which are stored in advance in the cooking-flow database 108. In the example of FIG. 11B, a cooking flow F1 of braised beef and potatoes, a cooking flow F2 of curry, a cooking flow F3 of stir-fried vegetables and a cooking flow F4 of an omelet are stored beforehand in the cooking-flow database 108.

With respect to the cooking flow shown in FIG. 11A, as the flow chart of FIG. 8 is repeated, an object will be completed upward from below. Herein, the cooking operations of "cut" for a potato, an onion and beef at the lowermost stage are not necessarily executed simultaneously. They are cooking operations which are first executed for each ingredient, and thus, these objects of "cut" are placed at the same stage.

Then, the recognition processing section 110 calculates a relevance factor of the cooking flow shown in FIG. 11A to each of the cooking flows F1 to F4 of braised beef and potatoes to an omelet shown in FIG. 11B. In the example of FIG. 11B, the relevance factors to the cooking flows F1 to F4 for braised beef and potatoes, curry, stir-fried vegetables and an omelet are calculated as 0.8, 0.7, 0.4 and 0.2, respectively. Then, the recognition processing section 110 deletes the cooking flows F3 and F4 of stir-fried vegetables and an omelet whose relevance factors are below a predetermined value (e.g., 0.5), from the subject of matching in the next mapping. In other words, in the following mapping, no relevance factor is calculated to the cooking flows F3 and F4 of stir-fried vegetables and an omelet. This helps speed up a flow-matching processing.

In a step S16, based on the relevance factor of each primary certainty factor which has been calculated at the step S14 to each cooking flow which has been calculated at the step S15, the feature-quantity template creation section 106 obtains a representative value (e.g., the average value) of the relevance factors. Then, it multiplies the representative value by each primary certainty factor to calculate a final certainty factor. Sequentially, it sets this final certainty factor as a new template certainty factor. Then, it writes it in the corresponding field of the feature-quantity template T4, so that the feature-quantity template T4 is updated.

The processing of the step S16 will be described, using the concrete example shown at the step S14. The primary certainty factors C1 and C2 are multiplied by the representative value of braised beef and potatoes shown in FIG. 11B. Thereby, final certainty factors D1 and D2 are obtained. Then, the obtained final certainty factors D1 and D2 are written in the field of round slicing for a potato in the feature-quantity template T4, so that the feature-quantity template T4 is updated.

In a step S17, the feature-quantity template creation section 106 multiplies each primary certainty factor which has been calculated at the step S14 by the relevance factor of each primary certainty factor to each cooking flow which has been calculated at the step S15. Thereby, a final certainty factor by cooking recipe is calculated. Then, it writes this final by-cooking-recipe certainty factor, as the template certainty factor, in the corresponding field of the corresponding by-cooking-recipe template. Consequently, the by-cooking-recipe template is updated.

As a concrete example, let's describe braised beef and potatoes, using FIGS. 11A and 11B. The relevance factor of braised beef and potatoes is calculated as 0.8. Then, the primary certainty factor which is included in each object of the cooking flow shown in FIG. 11A is multiplied by 0.8. Thereby, a final certainty factor is calculated. Next, the calculated final certainty factor is written in the field of round slicing for a potato in the by-recipe feature-quantity template of braised beef and potatoes. Thereby, the by-recipe feature-quantity template of braised beef and potatoes is updated.

In a step S18 shown in FIG. 8, the recognition processing section 110 refers to the updated feature-quantity template T4 and by-recipe template, so that the cooking recipe can be estimated. In addition, recognition can be given to the ingredient and cooking operation which correspond to the observation data that has been acquired by the sensing section 200. In this case (YES at the step S18), the processing ends.

On the other hand, at the step S18, if the cooking recipe cannot be estimated, and if the ingredient and the cooking operation cannot be recognized (NO at the step S18), the processing returns to the step S11. Sequentially, the processing of the step S12 and its following steps is executed.

Herein, if a template certainty factor which is stored in a field that has a by-recipe feature-quantity template or a feature-quantity template becomes greater by a certain value or beyond a template certainty factor which is stored in another field, the recognition processing section 110 recognizes the ingredient and cooking operation which correspond to this field as the ingredient and cooking operation which correspond to the observation data acquired by the sensing section 200. Besides, it recognizes, as a cooking recipe for a dish which is prepared at present by a person, the cooking recipe which corresponds to the cooking flow in which the relevance factor which has been calculated at the step S15 is equal to, or more than, a certain value.

As described above, the cooking flow shown in FIG. 11A is gradually completed as the flow chart shown in FIG. 8 is repeatedly executed. Therefore, the person is preparing a dish for any cooking recipe of the cooking recipes which are stored in the cooking-flow database 108, the cooking flow shown in FIG. 1A comes close to any cooking flow of the cooking flows which are stored in the cooking-flow database 108. In other words, a specific cooking-flow relevance factor which is stored in the cooking-flow database 108 becomes greater than any other cooking-flow relevance factor. In line with this, a template certainty factor rises in a specific field of a by-recipe feature-quantity template for the cooking flow whose relevance factor has increased. Thereby, the ingredient and the cooking operation can be recognized.

Figure 12:
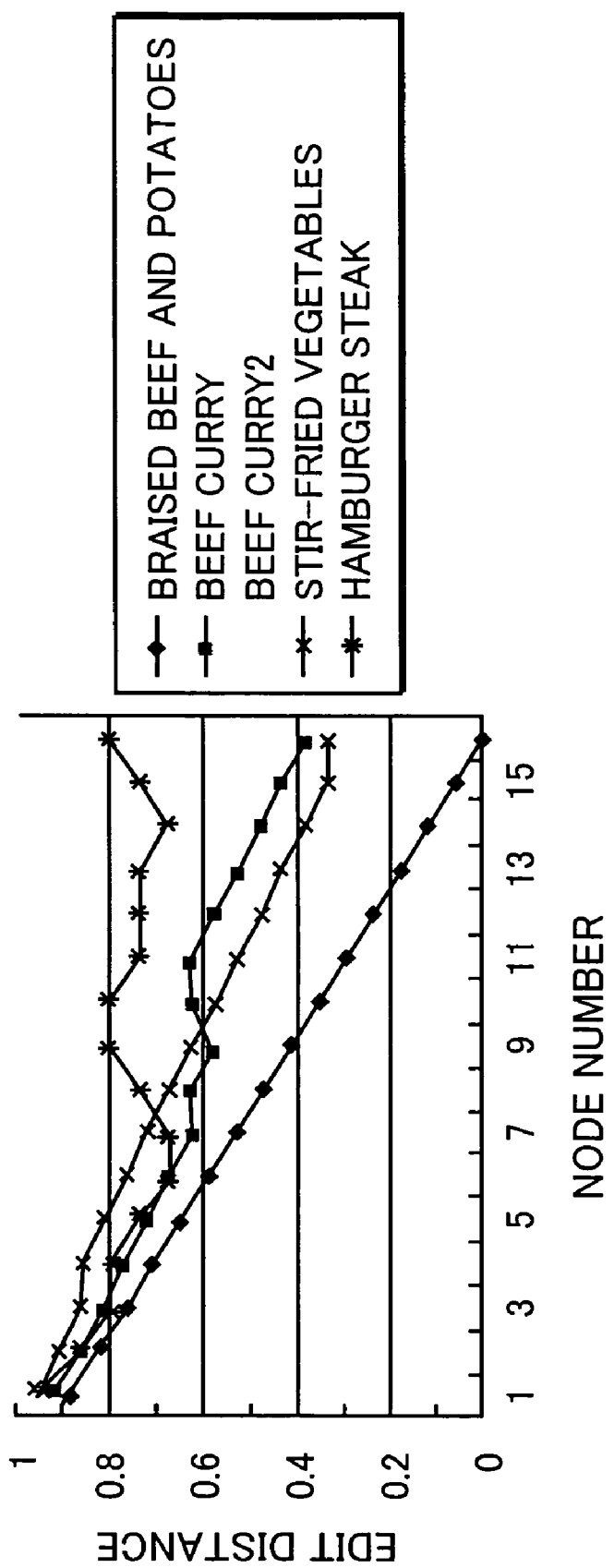
FIG. 12 is a graphical representation, showing the correlation between a node number of an observation flow and an edit distance.

FIG. 12 is a graphical representation, showing the correlation between a node number of an observation flow and an edit distance. The vertical axis expresses an edit distance and the horizontal axis represents a node number of an observation flow. Herein, the observation flow indicates a cooking flow which is created according to observation data that is acquired by the sensing section 200. The node number of an observation flow expresses the number of objects shown in FIG. 11A. The edit distance is a numerical value which indicates an approximation degree of an observation flow to a cooking flow. For example, let's assume that a person is now preparing braised beef and potatoes. The higher the relevance factor becomes of the cooking flow which has been created using the observation data acquired by the sensing section 200 to the cooking flow of braised beef and potatoes which is stored in the cooking-flow database 108, the smaller the value of an edit distance will be.

FIG. 12 shows graphs of braised beef and potatoes, beef curry, beef curry 2, stir-fried vegetables and hamburger steak. It can be seen that in any graphs except that of hamburger steak, their edit distances are reduced as the node numbers goes up. Therefore, as the flow chart shown in FIG. 8 is repeated, the relevance factor increases to a specific cooking flow of the cooking flows which are stored in the cooking-flow database 108. As a result, the cooking recipe for the dish which is presently prepared by the person can be specified.

Next, the processing for determining an ingredient and a cooking operation shown at the step S12 of FIG. 8 will be described in detail along the flow chart shown in FIG. 13. The following processing is executed by the recognition processing section 110. First, in a step S21, background regions are removed from both images of an optical image which is photographed by the optical camera 10 and a thermal image which is photographed by the thermal camera 20.

Herein, the background region of an optical image is eliminated, using a known background difference processing. In terms of the thermal image of the i-th frame in a thermal image, using a median filter, a region i is extracted in which pixels whose temperature is lower than a predetermined value lie continuously at a certain size or beyond. Then, this region is set as an ingredient region. In terms of the thermal image of the i+1th frame, a region i+1 is extracted in the same way.

Then, the extracted region is tracked so that an ingredient region is extracted. Thus, the region other than the ingredient regions is get rid of as the background region. Herein, if the distance by which the region i+1 moves with respect to the region i is more than a predetermined value, the movement distance is too long. Thus, tracing the ingredient region is judged improper, so that the ingredient region is not extracted.

Herein, in a thermal image and an optical image, their background regions are removed by setting the value of each pixel of the extracted background images to a predetermined low-gradation value (e.g., 0). Besides, for the ingredient region, a predetermined offset value is added to the value of the component pixels.

In this case, the region other than a person's hands and an onion which are included in the optical image shown in FIG. 14A is displayed in black as shown in FIG. 14B. It can be seen that the background region is removed from the optical image. In addition, the region except an onion which is included in the thermal image shown in FIG. 14C is displayed, as shown in FIG. 14D, blackishly as the background region. It can be seen that the background region is removed from the thermal image.

In a step S22, both background images which have been extracted at the step S21 are subjected to an expansion processing. Thereafter, they undergo a compression processing, so that noises, such as small holes or islands, are eliminated which are included in the background images.

In a step S23, a coordinate transformation is executed so that the coordinate systems of a thermal image and an optical image can be placed together. In a step S24, the thermal image and the optical image whose background regions have been removed are multiplied together. Then, a region where pixel data which is greater than a predetermined value exists continuously by a fixed number of pieces (i.e., over a certain area) or above it is extracted as the ingredient region.

In this case, the ingredient region is extracted, as shown in FIG. 14E. Herein, it can be seen that the background region shown in FIG. 14D includes more noises than the background region shown in FIG. 14B. Besides, it can also be seen that only the onion is extracted in FIG. 14D while the hands as well as the onion are extracted in FIG. 14B.

Accordingly, by multiplying both images together, the value of a pixel which indicates a noise that appears only in either image of a thermal image and an optical image becomes smaller and is removed. Consequently, the ingredient region can be more precisely extracted.

In a step S25, the image which has been obtained by the multiplication at the step S24 is divided into each ingredient region. Herein, if a plurality of ingredient regions have been extracted at the step S24, a rectangular frame which has a slightly larger area than the area of each ingredient region is allocated to each ingredient region. Thereby, the above described multiplication image is split into ingredient images.

In a step S26, the template matching is executed of each ingredient image with a color-feature template (described later), so that the ingredient which is expressed by each ingredient image can be specified. This color-feature template is given for every ingredient and is stored in advance in a memory (not shown).

Specifically, among the frames of a predetermined frame number (FRAMEstartafterCook) from the time when an ingredient first emerges in the optical camera 10 and the thermal camera 20, an average value HbeforeCook of hue histograms and an average value SbeforeCook of saturation histograms are obtained in the ingredient region for each frame from the time when a person's hand region comes into contact with the ingredient region until the time when it loses contact.

In addition, if the hand region is kept out of contact with the ingredient region in the frames whose number is equal to, or more than, a predetermined frame number (FRAMEendafterCook), then the decision is made that the cooking operation is completed. The cooking operation's end is judged in this way, thus helping prevent any wrong decision from being made, like judging the cooking operation completed when the cooking operation is just kept in a temporary operation blank.

After the cooking operation has ended, in each frame of the rest among the frames of FRAMEstartafterCook, the average value of hue histograms is obtained as HafterCook and the average value of saturation histograms is obtained as SafterCook.

Herein, HbeforeCook is called the color feature of hue before a cooking operation; SbeforeCook is called the color feature of saturation before a cooking operation; HafterCook is called the color feature of hue after a cooking operation; and SafterCook is called the color feature of saturation after a cooking operation. Besides, HbeforeCook, SbeforeCook, HafterCook and SafterCook are all together called a color feature.

Next, the color-feature template of hue before a cooking operation which is predetermined for each ingredient is expressed as Hbefore (food); the color-feature template of hue after a cooking operation is expressed as Hafter(food); the color-feature template of saturation before a cooking operation is expressed as Sbefore(food); and the color-feature template of saturation after a cooking operation is expressed as Safter(food). A distance DbeforeHue(food) between the color-feature template of hue before a cooking operation and the color feature of hue before a cooking operation is obtained, using a formula (1). Herein, the food in parentheses is an argument which indicates an ingredient. Herein, all of Hbefore(food), Hafter(food), Sbefore(food) and Safter(food) are together called a color feature.

$$D\text{beforeHue}(food) = \text{root}((H\text{beforeCook} - H\text{before}(food))t(H\text{beforeCook} - H\text{before}(food))) \quad (1)$$

In addition, a distance Dbefore(food) between the color-feature template of saturation before a cooking operation and the color feature of saturation before a cooking operation is obtained, using a formula (2). Herein, root((A−B)t(A−B)) indicates the Euclidean distance between a vector A and a vector B.

$$D\text{beforeSat}(food) = \text{root}((S\text{beforeCook} - S\text{before}(food))t(S\text{beforeCook} - S\text{before}(food))) \quad (2)$$

Then, by weighting and adding the distance of a hue before a cooking operation and the distance of a saturation before a cooking operation, the distance Dbefore(food) between the color feature and the color-feature template of each ingredient before a cooking operation is obtained. This arithmetic expression is expressed using a formula (3).

$$D\text{before}(food) = wD\text{beforeHue}(food) + (1-w)D\text{beforeSat}(food) \quad (3)$$

Similarly, Dafter(food) is calculated about the distance between the color feature and the color-feature template after a cooking operation. Then, by adding up Dbefore (food) and Dafter (food), a color-feature change distance McolorConstraint(food) is obtained. Herein, w denotes a weighting factor.

$$M\text{colorConstraint}(food) = D\text{before}(food) + D\text{after}(food) \quad (4)$$

Then, the color-feature change distance determines that the smallest ingredient is an ingredient which is given in an ingredient image.

Let us sum up the processing of the step S26. For example, the sensing section 200 acquires ingredient data on an onion, a potato and a carrot. Then, in an ingredient image, if the color-feature changes distances for the color-feature template of the onion, the color-feature template of the potato and the color-feature template of the carrot become higher in this order, then a decision is made that the ingredient region which is included in this ingredient image indicates the carrot.

Figure 15A:
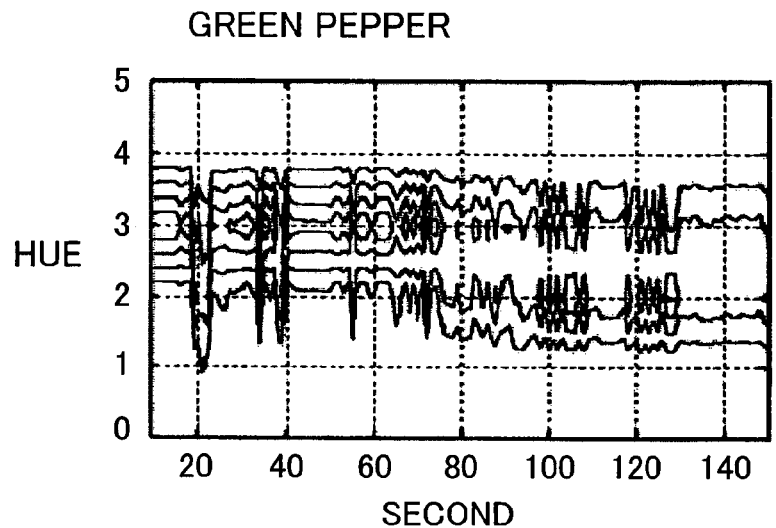
FIGS. 15A to 15C are graphical representations, showing a change in the hue, saturation and region size of a green pepper as time elapses.
Figure 15B:
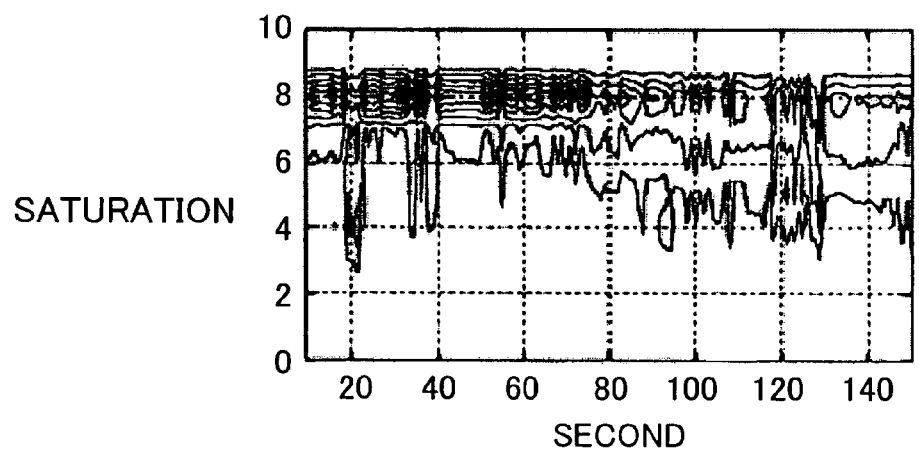
Figure 15C:
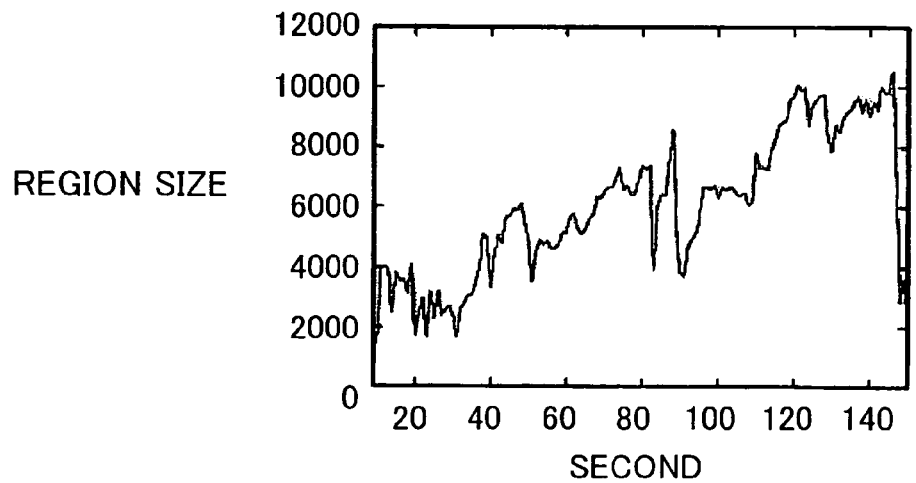
Figure 16A:
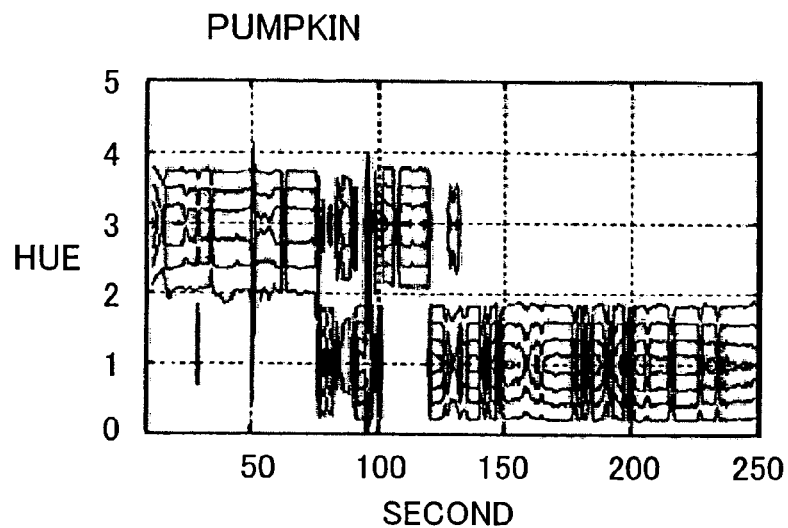
FIGS. 16A to 16C are graphical representations, showing a change in the hue, saturation and region size of a pumpkin as time elapses.
Figure 16B:
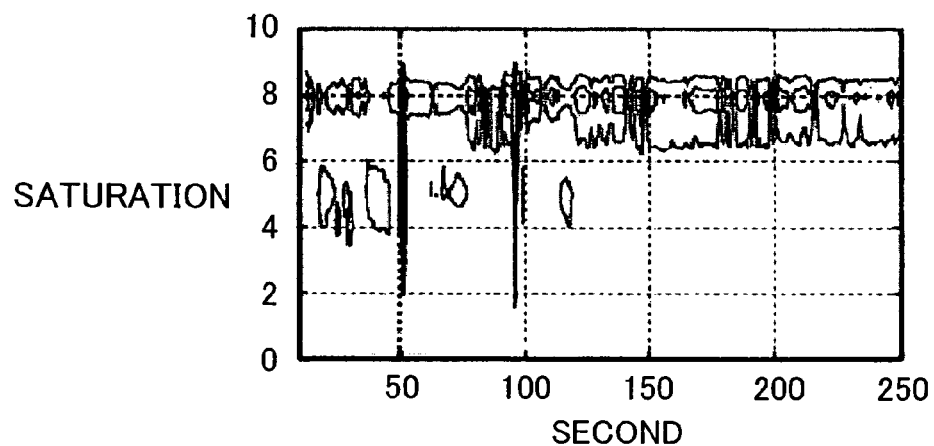
Figure 16C:
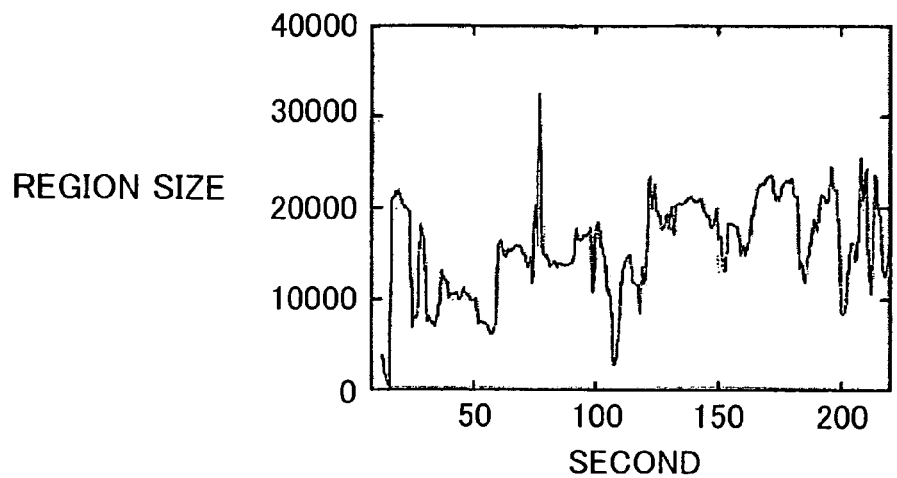

FIGS. 15A to 15C and FIGS. 16 to 16C are graphical representations, each showing a change in the hue, saturation and region size of a green pepper and a pumpkin as time elapses. FIGS. 15A and 16 each show the hue, FIGS. 15B and 16B, the saturation, and FIGS. 15C and 16C, the region size. Second designates a time (seconds) which passes after an ingredient emerges in an observation region. In terms of the hue and saturation, twelve levels of histograms are calculated, respectively. Then, they are plotted so that contour lines are obtained. The contour lines are shown by cutting out only the parts (where the hue is 0 to 5 and the saturation is 0 to 10) in which values are conspicuous.

First, let's pay attention to the hue and the saturation. At the beginning, the histograms of the green pepper are similar to those of the pumpkin. Then, these ingredients are cut so that their inside colors appear. At this time, especially, the pumpkin's color changes largely, which produces a clear difference between both. On the other hand, the green pepper is cut into thin pieces, thereby increasing the number of its surfaces which are displayed in the screen image, and making the size larger. In contrast, the pumpkin is roughly cut, so that its surfaces will not increase by so many numbers. Hence, it can be seen that its size remains unchanged.

FIGS. 17A to 17D are graphical representations, showing histograms of the hue and saturation of an apple and a tomato before and after a cooking operation is executed. FIG. 17A shows a histogram of the hue before the cooking operation is executed. FIG. 17B shows a histogram of the saturation before the cooking operation is executed. FIG. 17C shows a histogram of the hue after the cooking operation is executed. FIG. 17D shows a histogram of the saturation after the cooking operation is executed. In FIGS. 17A to 17D, the solid lines indicate the apple and the dotted lines indicate the tomato.

The apple and the tomato both have a red surface. Hence, as shown in FIGS. 17A and 17B, it can be seen that the graph of the apple approximates that of the tomato before the cooking operation. However, the apple whitens if it is peeled, while the tomato is left red if it is cut. Therefore, as shown in FIGS. 17C and 17D, the graph of the apple is largely different from that of the tomato. In other words, if a red object turns into white after the cooking operation is executed, it can be said that this red object is closer to an apple than it is to a tomato.

In addition, before a cooking operation, a tomato and a red pepper are both red and resemble each other in characteristics. However, let's assume that the tomato is cut into round slices, but it is not minced. If this information can be obtained from among cooking recipes, when a result is obtained like the fact that a red object has been minced, such an ingredient can be highly likely estimated to be a red pepper.

Next, a description will be given about why not an RGB calorimetric system but an HSV calorimetric system is used as the above described color feature. The RGB calorimetric system is a system in which various colors are reproduced using the three primary colors of light. In contrast, the HSV calorimetric system is said to be a calorimetric system in which human sensations are reproduced, though it is difficult to relate it to the physical quantities of light. Therefore, in an image recognition, the HSV calorimetric system has frequently been adopted. Besides, as the above described color feature, hue and saturation are used, not lightness. This is because without using lightness for mainly expressing the shadow of an object, the color (i.e., diffused reflection color) of the object itself can be picked up from hue and saturation.

Next, advantages will be described which can be obtained if template matching using a color feature is adopted, instead of template matching using a shape feature. In general, in template matching, a shape feature such as a circular level, or a texture feature, is frequently used. However, a person usually touches an ingredient with the hands when cooking it. Hence, template matching using a shape feature cannot be used.

In addition, the texture feature is for evaluating the roughness, pattern or the like of the surface of an object, using an edge, a frequency or the like. Therefore, (1) A relatively-high resolution and a comparatively-wide observation range are necessary for obtaining a texture feature, but these cannot be easily secured. (2) A roughness appears as a shadow in an image, which depends upon how to apply light. Thus, it is difficult to constantly keep a uniform lighting environment in a practical environment. (3) Several ingredients each do not necessarily have the same level of surface characteristics, even though their names are identical. The ingredients may be different in pattern or feel from each other, thus making poorer the reproducibility of a feature quantity. For these reasons, it is more desirable that template matching using a color feature be used than using a shape feature or a texture feature.

Figure 13:
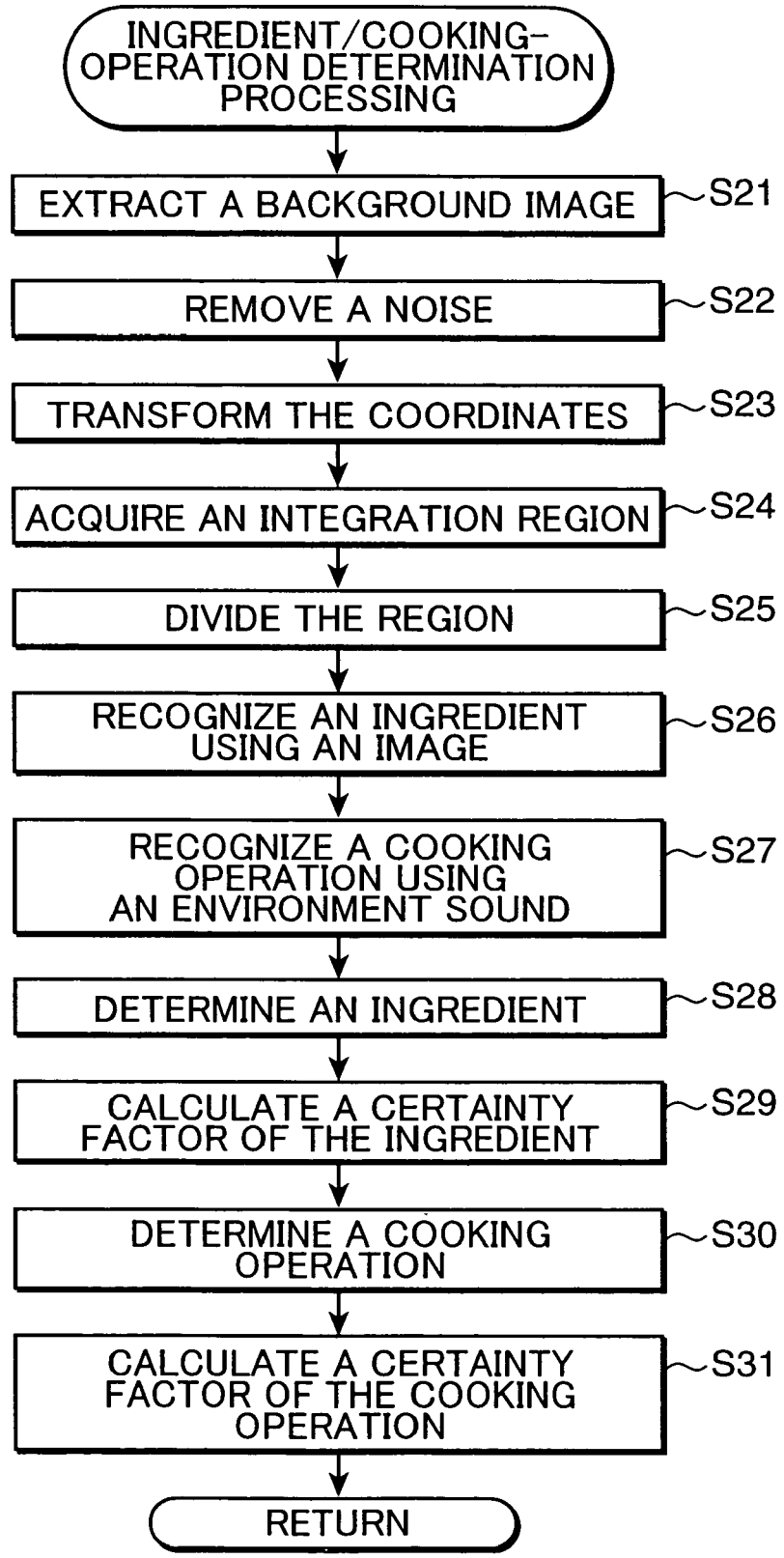
FIG. 13 is a flow chart, showing a processing for determining an ingredient and a cooking operation.

In a step S27 shown in FIG. 13, a cooking operation is estimated using an environment sound which is acquired by the sensing section 200. Specifically, based on an environment sound, the number of knocks is counted which are produced when an ingredient is cut on a cutting board. Then, using formulas (5) to (7), the following distances are obtained: a distance Dcook(peel,cut) which indicates how close a knock number cut is to peeling; a distance Dcook(rect, cut) which indicates how close the knock number cut is to fine cutting; and a distance Dcook(chop, cut) which indicates how close the knock number cut is to chopping which includes round slicing and julienne cutting. Thereby, the cooking operation which corresponds to the shortest distance is determined as the cooking operation which is now performed by the person.

$$D\text{cook}(peel,cut) = |cut - \text{AVERAGEpeel}|/\sigma peel \quad (5)$$

$$D\text{cook}(chop,cut) = |cut - \text{AVERAGEchop}|/\sigma chop \quad (6)$$

$$D\text{cook}(rect,cut) = |cut - \text{AVERAGE}rect|/\sigma rect \quad (7)$$

Herein, AVERAGEpeel, AVERAGEchop and AVERAGErect are each the average value of experimental data which is obtained in an experiment that is conducted beforehand. Then, σ peel, σ chop and σ rect are each the standard deviation of experimental data in an experiment that is made in advance.

In a step S28, a combination of an ingredient and a cooking operation is extracted in the cooking recipes which are stored in the recipe database 101. Then, a cooking-operation distance McookConstraint(food) between each food and an ingredient in an image is obtained, using a formula (8).

$$M\text{cookConstraint}(food) = \min\{D\text{cook}(act,cut) | \text{COOK}(act,food) = 1\} \quad (8)$$

Herein, if there is the combination of an ingredient and a cooking operation in the cooking recipes which are stored in the recipe database 101, COOK(act,food) is 1. On the other hand, unless there is the combination of an ingredient and a cooking operation, COOK(act,food) is 0. In terms of Mcook-Constraint(food), min{A} denotes the minimum value of A in the formula (8). Therefore, the minimum value of Dcook(act, food) is McookConstraint(food). Then, food which is indicated by this McookConstraint(food) is determined as the ingredient which is cooked by the person.

Herein, the smaller the value of McookConstraint (food) is, the more cooking operations which can be performed for the actual ingredient food are added and the more probably the ingredient can be precisely recognized.

In a step S29, McookConstraint(food) and McolorConstraint(food) which is obtained in the formula (4) are added together (in a formula (9)). Thereby, MConstraint(food) is calculated. Then, 1−MConstraint(food) is calculated as the certainty factor of the ingredient which has been determined at the step S28.

$$MConstraint(food) = McolorConstraint(food) + McookConstraint(food) \quad (9)$$

In a step S30, the arithmetic of formulas (10) to (12) is executed. Among these formulas, the cooking operation which is indicated in the formula that has the minimum arithmetic result is determined as the cooking operation which is performed by the person.

$$MCook(peel,cut) = DCook(peel,cut) \times MINpeel \quad (10)$$

$$MCook(chop,cut) = DCook(peel,cut) \times MINchop \quad (11)$$

$$MCook(peel,rect) = DCook(peel,cut) \times MINrect \quad (12)$$

Herein, the following formulas are satisfied.

$$MINpeel = \min\{MConstraint(food) | COOK(peel,food) = 1\}$$

$$MINchop = \min\{MConstraint(food) | COOK(chop,food) = 1\}$$

$$MINrect = \min\{MConstraint(food) | COOK(rect,food) = 1\}$$

In a step S31, among the arithmetic of formulas (10) to (12), the arithmetic value of the formula which has the minimum arithmetic outcome is subtracted from 1. Thereby, a certainty factor is calculated for the cooking operation which has been calculated at the step S30.

As described so far, in this ingredient cooking-operation recognition system, a template certainty factor is stored in the feature-quantity template T4 itself. Hence, a definition can be given of how reliable an ingredient or a cooking operation which is acknowledged in each moment by a camera is. Besides, a primary certainty factor passes through the step of mapping, and thereby, it becomes more certain gradually to turn into a final certainty factor. Consequently, a recognition result which is more reliable can be secured.

Furthermore, in this ingredient cooking-operation recognition system, a cooking recipe can be specified as the secondary effect. However, the greatest advantage according to this ingredient cooking-operation recognition system is to decide how reliable an ingredient or a cooking operation which is a subject in each moment by a camera, a microphone or the like is.

As a result, a high-level interaction, which has been conventionally inadequate, can also be conducted in real time. In other words, in a system which recognizes a person's operation using various conventional sensors, there are the following disadvantages. As a matter of course, a limit lies to recognition by each type of sensor. Besides, taking costs into account, usable sensors are limited, and thus, their capabilities are also restricted.

Under these constraints, if the certainty factor of a subject to be recognized is low, then any support is essential through the interaction with a user, mainly using a voice, together with an image or the like. It is important to prompt a user to confirm a menu, a cooking recipe, an ingredient and a cooking operation. By doing so, the above described sensor performance can be met, and this system's reliable relationship with a user can be strengthened and established.

Specifically, in FIG. 11B, in terms of the recipes of "braised beef and potatoes" and "curry" which each have a different relevance factor, it is unclear whether the object O1 of FIG. 11A is for "braised beef and potatoes" which has the greatest relevance factor. However, even in this case, by obtaining a certainty factor by multiplying a primary certainty factor by the relevance factor, a decision can be made whether or not either is more probable or both are probable.

Using the interaction based on this decision result, it is possible to change a tone, for example, "What are you cooking now?", or "The recipe you are now conducting is for braised beef and potatoes (not for curry), aren't you?". Of course, if there is an ingredient or a cooking operation whose final certainty factor is an extremely high value, then as an interaction to a user, a piece of advice can be actively given, such as "In order to prepare tasty braised beef and potatoes, different from curry, you shouldn't braise it too long." On the other hand, if both final certainty factors are low, which is which cannot be determined. In that case, no interaction is offered, or an interaction is given which asks a user the very recipe. As a result of the above description, on the basis of the certainty factor according to the overall situation, an ingredient or a cooking operation can be recognized in each moment more precisely than any conventional such system.

The present invention can be applied to the following aspects.

(1) The display unit 40 shown in FIG. 1B may also be a projector, an IH cooker, or a display unit which is embedded in a cooking table.

(2) In the above described embodiment, the thermal camera 20 is used, but this may also be replaced with a monocular infrared sensor. In that case, a temperature range is estimated in cooperation with the optical camera 10. Based on an area ratio, the difference between a high-temperature range and a low-temperature range can be recognized. In such a case, however, a person's hands are hard to distinguish from another object. But whether or not there are a person's hands in a camera image can be sufficiently recognized. Hence, an image frame where a person's hands lie in a camera image can also be neglected.

(3) As the value of a template certainty factor which is stored in the ingredient table, the cooked-food table and the cooking-operation table shown in FIGS. 7A, 7B and 7C, an image-processing certainty factor which is calculated in advance by a manufacturer or the like of this system may also be used. Besides, as a feature-quantity template, the one that is secured as this system is used may also be continuously used. Thereby, it can be considered that a user's own reliable system is provided.

(4) If the relevance factor shown in FIG. 11B is low (e.g., 0.5 or below) or unclear, a final certainty factor may also be assumed to be equal to a primary certainty factor.

SUMMARY OF THE PRESENT INVENTION (1) The ingredient cooking-operation recognition system according to the present invention, characterized by including: a sensing means for acquiring observation data which includes at least either of an image around the hands of a person who performs a cooking operation and an environment sound that is produced by the cooking operation; a feature-quantity template in which various cooking operations that are predetermined for various ingredients are stored in a table form, together with a template certainty factor that is a certainty factor which is predetermined for each cooking operation of the ingredients; a cooking-flow creating means for, based on the observation data which is acquired by the sensing means, calculating an observation certainty factor which indicates the certainty factor of at least either of an ingredient that is cooked by the person and the cooking operation of the ingredient, and based on this observation certainty factor, creating a cooking flow for a dish which is prepared by the person; a primary certainty-factor calculating means for, based on the template certainty factor and the observation certainty factor, calculating a primary certainty factor which is a certainty factor for each of objects that make up the cooking flow which is created by the cooking-flow creating means; and a cooking-operation recognizing means for calculating a final certainty factor based on the primary certainty factor which is calculated by the primary certainty-factor calculating means, updating the feature-quantity template by considering this final certainty factor as a new template certainty factor, and based on this feature-quantity template, recognizing the ingredient and the cooking operation that correspond to the observation data which is acquired by the sensing means.

According to this configuration, based on an image around the hands of a person who performs a cooking operation and an environment sound which is produced by the cooking operation which is acquired by the sensing means, an observation certainty factor is calculated of an ingredient which is cooked by the person and the cooking operation of this ingredient. Then, a cooking flow is created based on this observation certainty factor. Next, based on the template certainty factor and the observation certainty factor, a primary certainty factor is calculated for each of the objects that make up the cooking flow. Then, a final certainty factor is calculated based on these relevance factor and primary certainty factor. Thereby, the ingredient of an image which is acquired by the sensing means and its cooking operation are recognized. In short, a cooking operation and an ingredient are recognized based on the feature-quantity template in which the template certainty factor is stored. This makes it possible to precisely estimate an ingredient and a cooking operation.

(2) Furthermore, in the above described configuration, it is preferable that the ingredient cooking-operation recognition system further include: a cooking-flow database which stores cooking flows which are created in advance for various dishes; and a relevance-factor calculating means for, using mapping, calculating a relevance factor that indicates which of the cooking flows that are stored in the recipe-flow database is closest to the cooking flow which is created by the cooking-flow creating means, the cooking-operation recognizing means recognizing an ingredient and a cooking operation, based on the relevance factor which is calculated by the relevance-factor calculating means and the primary certainty factor.

According to this configuration, a relevance factor is calculated between a cooking flow which is beforehand created for every dish and a cooking flow which is created based on observation data. Then, an ingredient and a cooking operation are recognized on the basis of this relevance factor and a primary certainty factor. This further heightens the precision of a recognition.

(3) Moreover, in the above described configuration, preferably, the ingredient cooking-operation recognition system should further include: an ingredient table which is formed by an ingredient record that has a field where data that indicates an ingredient is stored and a field where various kinds of data on the ingredient are stored together with a template certainty factor that is predetermined for the data; a cooked-food table which is formed by a cooked-food record that has a field where data that indicates a cooking operation is stored and a field where various kinds of data on a change in an ingredient by the cooking operation are stored together with a template certainty factor that is predetermined for the data; a cooking-operation table which is formed by a cooking-operation record that has a field where data that indicates a cooking operation is stored and a field where various kinds of data on an environment sound that is produced by the cooking operation are stored together with a template certainty factor that is predetermined for the data; a cooking-recipe database which stores data that indicates an ingredient which is used for various cooking recipes and data that indicates a cooking operation for the ingredient; a table storing means for storing at least any one of the tables and an extracting means for extracting all kinds of ingredients and all kinds of cooking operations which are stored in the cooking-recipe database; and a feature-quantity template creating means for creating, as a feature-quantity template, a table which includes, as items, each ingredient that is extracted by the extracting means and each cooking operation that is extracted by the extracting means, the feature-quantity template creating means writing, in an optional field of the fields which make up the feature-quantity template, as the template certainty factor, the greatest certainty factor of the template certainty factors which are stored in each field of at least any record of the ingredient record of the ingredient table that stores the data which indicates the ingredient that corresponds to the optional field, the cooked-food record of the cooked-food table that stores the data which indicates the cooking operation that corresponds to the optional field and the cooking-operation record of the cooking-operation table that stores the data which indicates the cooking operation that corresponds to the optional field.

According to this configuration, a feature-quantity template to which a template certainty factor is attached can be obtained.

(4) In addition, in the above described configuration, it is preferable that: the sensing means have a thermal camera and an optical camera; and an image which is acquired by the sensing means include a thermal image which is photographed by the thermal camera and an optical image which is photographed by the optical camera.

According to this configuration, an ingredient and a cooking operation are recognized, using an optical image and a thermal image. This further heightens the precision of a recognition.

(5) Furthermore, in the above described configuration, it is preferable that the cooking-flow creating means: remove a background region from the optical image by executing a background difference processing on the optical image; remove, from the thermal image, as a background region, a region where the temperature is equal to, or higher than, a predetermined value; calculate an ingredient region which indicates an ingredient by multiplying the thermal image whose background region is removed and the optical image whose background region is removed; and calculate an observation certainty factor based on this ingredient region.

According to this configuration, the background region of an optical image is removed in a background difference processing. Thus, a background region is precisely removed from an optical image. In terms of a thermal image, the region where the temperature is equal to, or higher than, a predetermined value is removed as its background region. Hence, the temperature of an ingredient is considered to be lower than the temperature around it, and thus, background region is removed. Then, the optical image and thermal image whose background regions are removed are multiplied together. On the basis of the obtained image, the ingredient region is extracted. Therefore, the regions which are extracted as the ingredient region from both the optical image and the thermal image are regarded as the ingredient region. As a result, an ingredient region can be precisely extracted.

(6) Moreover, in the above described configuration, preferably, the cooking-flow creating means should obtain a histogram of hue and a histogram of saturation from an image which is acquired by the sensing means, and should estimate an ingredient by obtaining a correlation between these histograms and a color-feature template which is predetermined for each ingredient.

According to this configuration, an ingredient is estimated on the basis of a histogram of hue, thereby helping extract the ingredient precisely. Specifically, an ingredient is frequently grasped by a person. This state of the person's hands makes it difficult to estimate the ingredient if template matching based on a shape feature is used for the ingredient region. However, according to the present invention, a histogram of hue is used, thus helping estimate an ingredient precisely.

(7) In addition, in the above described configuration, it is preferable that: the relevance-factor calculating means estimate a cooking recipe based on a relevance factor; and a guidance means be further provided for giving, to the person, guidance on the cooking recipe which is estimated by the relevance-factor calculating means.

According to this configuration, guidance is given on a cooking recipe for a dish which is now prepared by a person. This allows the person to prepare the dish in an appropriate cooking process which corresponds to the cooking recipe.

(8) The ingredient cooking-operation recognition program according to the present invention, characterized by allowing a computer to function as: a sensing means for acquiring observation data which includes at least either of an image around the hands of a person who performs a cooking operation and an environment sound that is produced by the cooking operation; a feature-quantity template in which various cooking operations that are predetermined for various ingredients are stored in a table form, together with a template certainty factor that is a certainty factor which is predetermined for each cooking operation of the ingredients; a cooking-flow creating means for, based on the observation data which is acquired by the sensing means, calculating an observation certainty factor which indicates the certainty factor of at least either of an ingredient that is cooked by the person and the cooking operation of the ingredient, and based on this observation certainty factor, creating a cooking flow for a dish which is prepared by the person; a primary certainty-factor calculating means for, based on the template certainty factor and the observation certainty factor, calculating a primary certainty factor which is a certainty factor for each of objects that make up the cooking flow which is created by the cooking-flow creating means; and a cooking-operation recognizing means for calculating a final certainty factor based on the primary certainty factor which is calculated by the primary certainty-factor calculating means, updating the feature-quantity template by considering this final certainty factor as a new template certainty factor, and based on this feature-quantity template, recognizing the ingredient and the cooking operation that correspond to the observation data which is acquired by the sensing means.

INDUSTRIAL APPLICABILITY

The ingredient cooking-operation recognition system according to the present invention is capable of estimating a cooking recipe which is now performed by a person, and giving the person guidance on a proper cooking recipe. Therefore, it is useful as household cooking equipment.

The invention claimed is:

1. An ingredient cooking-operation recognition system comprising:
   a sensing means for acquiring observation data which includes an image around the hands of a person who performs a cooking operation and an environment sound that is produced by the cooking operation;
   a feature-quantity template in which various cooking operations that are predetermined for various ingredients are stored together with a template certainty factor that is a certainty factor which is predetermined for each cooking operation of the ingredients;
   a cooking-flow creating means for, based on the observation data, calculating an observation certainty factor which indicates the certainty factor of at least either of an ingredient that is cooked by the person and the cooking operation of the ingredient, and based on the observation certainty factor, creating a cooking flow for a dish which is prepared by the person;
   a primary certainty-factor calculating means for, calculating a primary certainty factor which is a certainty factor for each object that makes up the cooking flow based on the template certainty factor and the observation certainty factor;
   a cooking-operation recognizing means for recognizing the ingredient and the cooking operation that correspond to the observation data, based on the primary certainty factor; and
   a guidance means for providing guidance to the person regarding the cooking flow based on the ingredient and the cooking operation recognized by the cooking-operation recognizing means, wherein the person performs the cooking operation in accordance with the guidance.

2. The ingredient cooking-operation recognition system according to claim 1, further comprising:
   a cooking-flow database which stores cooking flows which are created in advance of cooking operations for various dishes; and
   a relevance-factor calculating means for, using mapping, calculating a relevance factor that indicates which of the cooking flows that are stored in the cooking-flow database is closest to the cooking flow which is created by the cooking-flow creating means,
   wherein the cooking-operation recognizing means calculates a final certainty factor based on the relevance factor which is calculated by the relevance-factor calculating means and the primary certainty factor, updates the feature-quantity template by considering the final certainty factor as a new template certainty factor, and based on the feature-quantity template, recognizes an ingredient and a cooking operation.

3. The ingredient cooking-operation recognition system according to claim 1, further comprising:

a table storing means for storing:
- an ingredient table which is formed by an ingredient record that has a field where data that indicates an ingredient is stored and a field where various kinds of data on the ingredient are stored together with the template certainty factor that is predetermined for the data;
- a cooked-food table which is formed by a cooked-food record that has a field where data that indicates a cooking operation is stored and a field where various kinds of data on a change in an ingredient by the cooking operation are stored together with the template certainty factor that is predetermined for the data; and
- a cooking-operation table which is formed by a cooking-operation record that has a field where data that indicates a cooking operation is stored and a field where various kinds of data on an environment sound that is produced by the cooking operation are stored together with the template certainty factor that is predetermined for the data, a cooking-recipe database which stores data that indicates an ingredient which is used for various cooking recipes and data that indicates a cooking operation for the ingredient;

an extracting means for extracting all kinds of ingredients and all kinds of cooking operations which are stored in the cooking-recipe database; and a feature-quantity template creating means for creating, as a feature-quantity template, a table which includes fields defined by items including each ingredient that is extracted by the extracting means and each cooking operation that is extracted by the extracting means, and for specifying, in an optional field of the fields which make up the feature-quantity template, the ingredient record of the ingredient table that stores the data which indicates the ingredient that corresponds to the optional field, the cooked-food record of the cooked-food table that stores the data which indicates the cooking operation that corresponds to the optional field and the cooking-operation record of the cooking-operation table that stores the data which indicates the cooking operation that corresponds to the optional field, and writing the greatest template certainty factor among the template certainty factors which are stored in each field of the specified records in the optional field.

4. The ingredient cooking-operation recognition system according to claim 1, wherein:
  the sensing means has a thermal camera and an optical camera; and
  an image which is acquired by the sensing means includes a thermal image which is photographed by the thermal camera and an optical image which is photographed by the optical camera.

5. The ingredient cooking-operation recognition system according to claim 4, wherein the cooking-flow creating means:
  removes a background region from the optical image by executing a background difference process on the optical image;
  removes, from the thermal image, as a background region, a region where the temperature is equal to, or higher than, a predetermined value;
  calculates an ingredient region which indicates an ingredient by multiplying the thermal image whose background region is removed and the optical image whose background region is removed; and
  calculates an observation certainty factor based on the ingredient region.

6. The ingredient cooking-operation recognition system according to claim 1, wherein the cooking-flow creating means obtains a histogram of hue and a histogram of saturation from an image which is acquired by the sensing means, and estimates an ingredient by obtaining a correlation between the histograms and a color-feature template which is predetermined for each ingredient.

7. The ingredient cooking-operation recognition system according to claim 2, wherein:
  the relevance-factor calculating means estimates a cooking recipe based on a relevance factor; and
  the guidance means provides guidance to the person regarding the cooking recipe.

8. A computer-readable recording medium which has recorded thereon an ingredient cooking-operation recognition program, for causing a computer to function at least as:
  a sensing means for acquiring observation data which includes an image around the hands of a person who performs a cooking operation and an environment sound that is produced by the cooking operation;
  a feature-quantity template in which various cooking operations that are predetermined for various ingredients are stored together with a template certainty factor that is a certainty factor which is predetermined for each cooking operation of the ingredients;
  a cooking-flow creating means for, based on the observation data, calculating an observation certainty factor which indicates the certainty factor of at least either of an ingredient that is cooked by the person and the cooking operation of the ingredient, and based on the observation certainty factor, creating a cooking flow for a dish which is prepared by the person;
  a primary certainty-factor calculating means for, calculating a primary certainty factor which is a certainty factor for each object that makes up the cooking flow based on the template certainty factor and the observation certainty factor; and
  a cooking-operation recognizing means for recognizing the ingredient and the cooking operation that correspond to the observation data, based on the primary certainty factor; and
  a guidance means for providing guidance to the person regarding the cooking flow based on the ingredient and the cooking operation recognized by the cooking-operation recognizing means, wherein the person performs the cooking operation in accordance with the guidance.

* * * * *